US006047265A

United States Patent [19]
Sugimori

[11] Patent Number: 6,047,265
[45] Date of Patent: Apr. 4, 2000

[54] ONLINE GIFT-PRESENTATION SYSTEM INCLUDING, A SERVER SYSTEM, TERMINAL EQUIPMENT, A GIFT-PRESENTING METHOD, AND A COMPUTER-READABLE RECORDING MEDIUM

[75] Inventor: Shinji Sugimori, Chiba, Japan

[73] Assignee: Justsystem Corp., Tokushima, Japan

[21] Appl. No.: 09/015,782

[22] Filed: Jan. 29, 1998

[30] Foreign Application Priority Data

Nov. 13, 1997 [JP] Japan .................................... 9-312379

[51] Int. Cl.[7] ............................ G06F 17/60; H04L 9/00
[52] U.S. Cl. ............................................ 705/26; 705/44
[58] Field of Search ................................ 705/26, 44, 27, 705/39

[56] References Cited

U.S. PATENT DOCUMENTS

| | | | |
|---|---|---|---|
| 5,555,496 | 9/1996 | Tackbary et al. | 705/27 |
| 5,699,526 | 12/1997 | Siefert | 705/27 |
| 5,715,314 | 2/1998 | Payne et al. | 380/24 |
| 5,757,917 | 5/1998 | Rose et al. | 705/26 |
| 5,781,632 | 7/1998 | Odom | 705/26 |
| 5,809,144 | 9/1998 | Sirbu et al. | 705/26 |
| 5,826,241 | 10/1998 | Stein et al. | 705/26 |
| 5,887,060 | 3/1999 | Ronning | 705/27 |
| 5,899,980 | 5/1999 | Wilf et al. | 705/26 |
| 5,909,492 | 6/1999 | Payne et al. | 705/27 |
| 5,930,768 | 7/1999 | Hooban | 705/27 |

FOREIGN PATENT DOCUMENTS

| | | |
|---|---|---|
| 5-165856 | 7/1993 | Japan . |
| 07225725 | 8/1995 | Japan . |
| 08147365 | 6/1996 | Japan . |
| 08214281 | 8/1996 | Japan . |
| 08249387 | 9/1996 | Japan . |
| 08263549 | 10/1996 | Japan . |
| 08335240 | 12/1996 | Japan . |

*Primary Examiner*—Allen R. MacDonald
*Assistant Examiner*—Michele Stuckey Crecca
*Attorney, Agent, or Firm*—Sughrue, Mion, Zinn, Macpeak & Seas, PLLC

[57] ABSTRACT

An online gift-presentation system in which, when a server system transmits encoded gift-contents and gift-presentation data thereof to a client as a gift-presenter and a client as a gift-receiver sends a request for decoding using the gift-presentation data to the server system, the server system transmits a decoding key for decoding the encoded gift-contents to the client as a gift-receiver.

22 Claims, 17 Drawing Sheets

2
208
DISK UNIT
CONTENTS DATABASE
208A
MANAGEMENT TABLE
208D
KEY DATABASE
208B
ACCOUNTING-LOG DATABASE
208C
INT
207
206
I/F
205
MODEM
210A
204
APPLICATION MEMORY
203
RAM
202
ROM
201
CPU
209
DUAL MEMORY
215
MODEM
216
I/F
217
CREDIT AUTHORIZING/ SETTLING SERVER 3
214
APPLICATION MEMORY
213
RAM
212
ROM
211
CPU
210B

| GENRE |
|---|
| ENTERTAINMENT |
| NEWSPAPER • PUBLISHING • BROADCASTING |
| MEDICAL TREATMENT • WELFARE |
| EDUCATION |
| HOBBY • AMUSEMENTS |
| LIVING • CONSUMPTION |
| INDUSTRY • ENTERPRISE |
| MARKETING |
| RESEARCH |
| • • • |

⇔

| TYPE | CONTENTS |
|---|---|
| PHOTO | COLLECTION OF PHOTOGRAPHS, SATELLITE PHOTOGRAPH etc. |
| PAINTING, ILLUSTRATION, CARTOONS, DESIGN | ILLUSTRATION FOR NEW YEAR'S CARD/POP PUBLICITY, COMIC etc, |
| MOVIES, ANIMATION | APPRECIATION OF MOVIE, COMIC etc. |
| MUSIC, VOICE, SOUND EFFECTS | APPRECIATION OF MUSIC, SOUND EFFECTS etc. |
| NEWS • LITERATURE • BOOKS | BULLETIN, STATISTICAL DATA OF MARKETING etc. |
| DATA, FONT, GRAPHIC | FIGURE FOR DESIGN, ELECTRONIC CATALOG, CAD DATA etc. |
| SOFTWARE | WALLPAPAER, VARIOUS KINDS OF TOOLS, GAMES, MACRO-COLLECTIONS etc. |
| OTHERS | FORTUNETELLING etc. |
| ⋮ | ⋮ |

FIG.7

| CONTENTS NUMBER | CONTENTS DATA | DECODING KEY DATA |
|---|---|---|
| 1 | CD1 | KD1 |
| 2 | CD2 | KD2 |
| 3 | CD3 | KD3 |
| ⋮ | ⋮ | ⋮ |

208A (CONTENTS DATA)

208B (DECODING KEY DATA)

| CONTENTS NUMBER | GIFT-PRESENTATION NUMBER | USER ID |
|---|---|---|
| 1 | CD1-1 | AAA |
| | — | BBB |
| | CD1-2 | CCC |
| 2 | CD2-1 | DDD |
| | — | EEE |
| ⋮ | ⋮ | ⋮ |

| USER ID | ACCOUNTING-LOG DATABASE |
|---|---|
| AAA | 97/10/ 1 : LA1 |
| | 97/10/10 : LA2 |
| | 97/10/15 : LA3 |
| BBB | 97/10/ 1 : LB1 |
| | 97/10/ 7 : LB2 |
| ⋮ | ⋮ |

ONLINE GIFT-PRESENTATION SYSTEM INCLUDING, A SERVER SYSTEM, TERMINAL EQUIPMENT, A GIFT-PRESENTING METHOD, AND A COMPUTER-READABLE RECORDING MEDIUM

FIELD OF THE INVENTION

The present invention relates to an online gift-presentation system for performing an online transaction of contents as commodity in an electronic market virtually constructed on a network, a server system applied in the online gift-presentation system, terminal equipment applied in the online gift-presentation system, a gift-presenting method in the online gift-presentation system, and a computer-readable recording medium with a program making a computer execute the method recorded therein.

BACKGROUND OF THE INVENTION

Conventionally, digital commodity such as application software have been sold and bought as contents by means of online shopping through an electronic market. This online shopping is based on a system in which a purchaser selects a desired contents from various types of contents displayed on a screen of a personal computer and sends a request to purchase the contents to a center, namely to a seller.

However, the online shopping system functions only for the purpose of a transaction of contents in which contents desired by a purchaser is purchased by the purchaser itself, namely based on 1 to 1, and for this reason, additional service such as presentation of a gift to any user other than the purchaser has not been realized yet. For realization of this service, an operational sequence for gift-presentation itself needs to be realized on an online system, so that it is expected to enhance the security thereof.

SUMMARY OF THE INVENTION

It is an object of the present invention to provide an online gift-presentation system which can realize gift presentation with the security insured in commercial transactions on a network, a server system applied in the online gift-presentation system, terminal equipment applied In the online gift-presentation system, a gift-presenting method In the online gift-presentation system, and a computer-readable recording medium with a program making a computer execute the method recorded therein.

With the present invention, when encoded gift-contents and gift-presentation data thereof are transmitted from a server system to a terminal equipment as a gift-presenter and a request for decoding using the gift-presentation data is sent from a terminal equipment as a gift-receiver to the server system, the server system transmits a decoding key for decoding of the encoded gift-contents to the terminal equipment as a gift-receiver, so that the request for decoding is sent directly from the gift-receiver, and for this reason gift presentation can be realized with the security insured in a transaction of commodity on the network.

With the present invention, when a report on completion of an operation for decoding of the encoded gift-contents using a decoding key is sent from a terminal equipment as a gift-receiver to a server system, the server system executes processing for accounting for the gift-contents on the terminal equipment as a gift-presenter, so that the timing of completion of an operation for decoding the contents on the side of the gift-receiver can be recognized as completion of all the processing for gift presentation, and for this reason the processing for accounting can be realized without any trouble such that the gift-receiver can not use the contents.

With the present invention, when encoded gift-contents and gift-presentation data thereof are transmitted from a server system to a terminal equipment as a gift-presenter and if a specified period of time passes, the server system refuses a request for a decoding key from the terminal equipment as a gift-receiver and cancels the processing for accounting for the gift-contents, so that, if there is any doubt that any trouble might have occurred in the processing for gift presentation from the lapse of time, the transaction of the gift itself can be canceled by the server system, and for this reason smooth and efficient distribution of commodity can be realized in the electronic market without making the processing for accounting delayed more than required.

With the present invention, a terminal equipment as a gift-presenter transmits encoded gift-contents and gift-presentation data thereof having been sent from a server system to a terminal equipment as a gift-receiver, and the server system distributes a decoding key to the terminal equipment as a gift-receiver in response to a request for decoding using the gift-presentation data therefrom so as to decode the gift-contents by the gift-receiver, so that the request for decoding is sent directly from the gift-receiver with the usability of the contents confirmed on the side of the gift-receiver, and for this reason gift presentation with high communication efficiency can be realized with the security insured in a transaction of commodity on the network.

With the present invention, a terminal equipment as a gift-receiver transmits a report on completion of decoding to a server system after the operation for decoding is complete, and the server system executes the processing for accounting for the gift-contents on a terminal equipment as a gift-presenter, so that the timing of completion of the operation or decoding the contents on the side of the gift-receiver can be recognized as completion of all the processing for gift presentation, and for this reason the processing for accounting can be realized without any trouble such that the gift-receiver can not use the contents.

With the present invention, a server system refuses, if a specified period of time passes after the contents is distributed, a request for a decoding key from a terminal equipment as a gift-receiver and cancels the processing for accounting for the encoded gift-contents, so that, if there is any doubt that any trouble might have occurred in the processing for gift presentation from the lapse of time, the transaction of the gift itself can be canceled by the server system, and for this reason smooth and efficient distribution of commodity can be realized in the electronic market without making the processing for accounting delayed more than required.

With the present invention, encoded gift-contents requested by a terminal equipment as a gift-presenter as well as gift-presentation data used for sending back a request to decode the contents are distributed to the terminal equipment as a gift-presenter in response to the request for gift-presentation sent from the terminal equipment as a gift-presenter, and then, a decoding key for decoding the encoded gift-contents is distributed to a terminal equipment as a gift-receiver in response to the request for decoding by the terminal equipment as a gift-receiver, so that the request for decoding is sent directly from the gift-receiver with the usability of the contents confirmed on the side of the gift-receiver, and for this reason gift presentation with high communication efficiency can be realized with the security insured in a transaction of commodity on the network.

With the present invention, in the online gift-presentation system in which a report on completion of decoding is transmitted from a terminal equipment as a gift-receiver after the operation for decoding is complete, when the report on completion of decoding is received from the terminal equipment as a gift-receiver, the processing for accounting for the gift-contents is executed on the terminal equipment as a gift-presenter, so that the timing of completion of decoding of the contents on the side of the gift-receiver can be recognized as completion of all the processing for gift presentation, and for this reason the processing for accounting can be realized without any trouble such that the gift-receiver can not use the contents.

With the present invention, if a specified period of time passes after the contents is distributed, a request for a decoding key from a terminal equipment as a gift-receiver is refused, and at the same time the processing for accounting for the encoded gift-contents is canceled, so that, if there is any doubt that any trouble might have occurred in the processing for gift presentation from the lapse of time, the transaction of the gift itself can be canceled by the server system, and for this reason smooth and efficient distribution of commodity can be realized in the electronic market without making the processing for accounting delayed more than required.

With the present invention, a terminal equipment as a gift-presenter transmits encoded gift-contents as well as gift-presentation data thereof having been sent from a server system to a terminal equipment as a gift-receiver, and the terminal equipment as a gift-receiver decodes the gift-contents using a decoding key distributed from the server system in response to the request for a decoding key with the gift-presentation data sent from the gift-receiver to the server system, so that the request for decoding is sent directly from the gift-receiver with the usability of the contents confirmed on the side of the gift-receiver, and for this reason gift presentation with high communication efficiency can be realized with the security insured in a transaction of commodity on the network.

With the present invention, in the online gift-presentation system in which the processing for accounting for gift-contents is executed on a terminal equipment as a gift-presenter when a report on completion of decoding is received from a terminal equipment as a gift-receiver, if the terminal equipment as a gift-presenter and the terminal equipment as a gift-receiver are the same, then the terminal equipment transmits a report on completion of decoding to a server system after the decoding is complete, so that the timing of completion of the operation for decoding the contents at the gift-receiver can be reported as completion of all the processing for gift presentation to the server system, and for this reason the processing for accounting can be realized without any trouble such that the gift-receiver can not use the contents.

With the present invention, when encoded gift-contents as well as gift-presentation data thereof is transmitted from a server system to a terminal equipment as a gift-presenter and a terminal equipment as a gift-receiver sends a request for a decoding key with the gift-presentation data to the server system, there is provided a step of transmitting a decoding key for decoding of the encoded gift-contents from the server system to the terminal equipment as a gift-receiver, so that the request for decoding is sent directly from the gift-receiver, and for this reason gift presentation can be realized with the security insured in a transaction of commodity on the network.

With the present invention, when a report on completion of the operation for decoding encoded gift-contents using a decoding key is sent from a terminal equipment as a gift-receiver to a server system, there is provided a step of executing the processing for accounting for the gift-contents on a terminal equipment as a gift-presenter, so that the timing of completion of the operation for decoding the contents at the gift-receiver can be recognized as completion of all the processing for gift presentation, and for this reason the processing for accounting can be realized without any trouble such that the gift-receiver can not use the contents.

With the present invention, when encoded gift-contents and gift-presentation data thereof are transmitted from a server system to a terminal equipment as a gift-presenter and if a specified period of time passes, there is provided a step of refusing a request for a decoding key from a terminal equipment as a gift-receiver as well as canceling of the processing for accounting for the gift-contents, so that, if there is any doubt that any trouble might have occurred in the processing for gift presentation from the lapse of time, the transaction of the gift itself can be canceled by the server system, and for this reason smooth and efficient distribution of commodity can be realized in the electronic market without making the processing for accounting delayed more than required.

With the present invention, there is provided a recording medium which records therein a program for making a computer execute the method according to any one of the present inventions, which makes the program machine-readable, and for this reason the operations according to any one of the present invention can be realized by a computer system.

Other objects and features of this invention will become clear from the following description with reference to the accompanying drawings.

BRIEF DESCRIPTION OF THE DRAWINGS

FIG. 6 is a view for explaining contents of a contents database according to Embodiment 1;

FIG. 7 is a view for explaining a method of managing a correlation between the contents database and a key database according to Embodiment 1;

FIG. 14 is a view for explaining con tents of a management database according to Embodiment 1;

FIG. 15 is a view showing an example of an accounting-log database according to Embodiment 1;

DESCRIPTION OF THE PREFERRED EMBODIMENTS

Detailed description is made hereinafter for preferred embodiments of the present invention with reference to the accompanying drawings.

Embodiment 1

Figure 1:
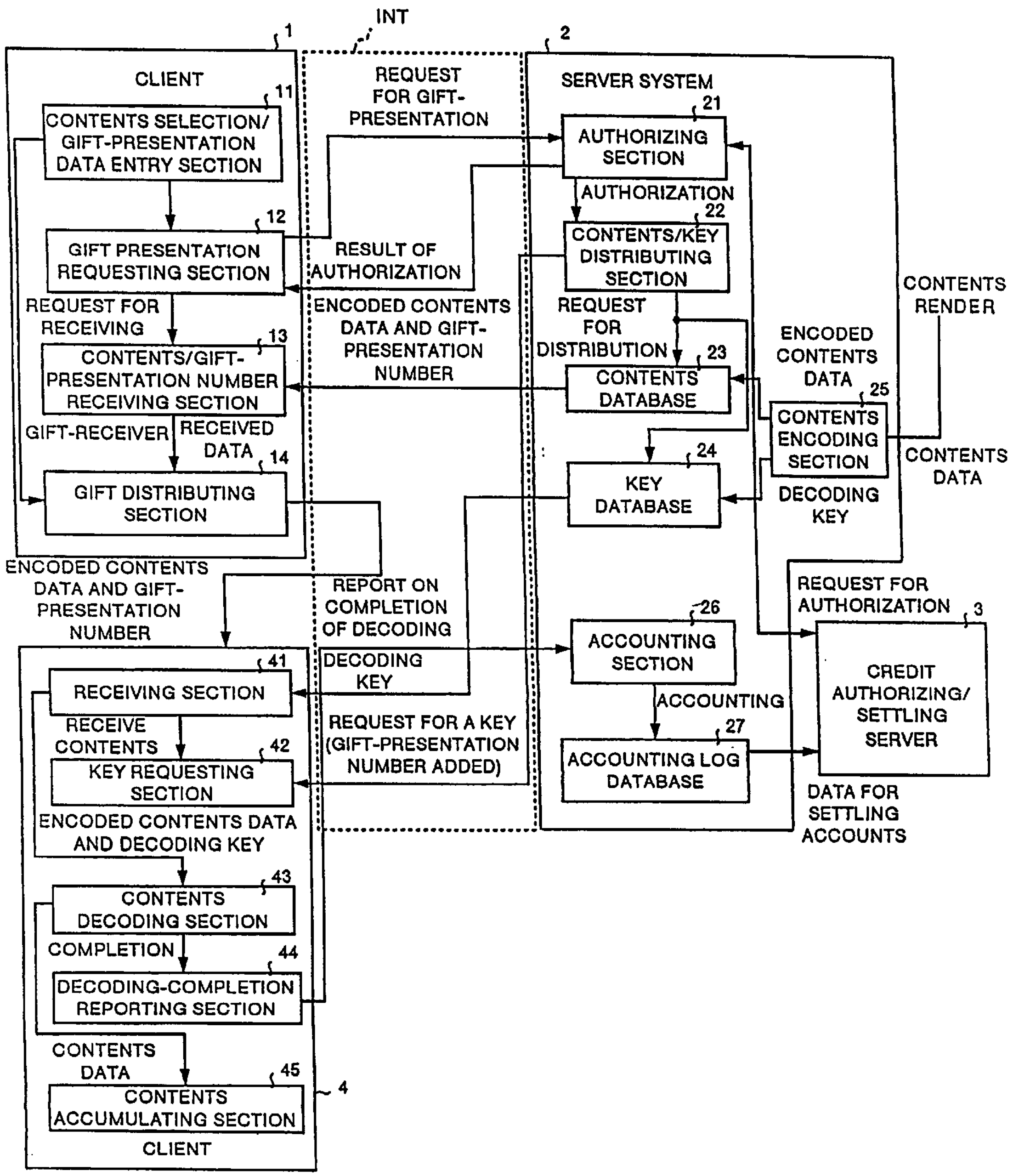
FIG. 1 is a block diagram functionally showing an online gift-presentation system according to Embodiment 1 of the present invention.

At first, description is made for an online gift-presentation system according to Embodiment 1 of the present invention from a point of functions thereof. FIG. 1 is a block diagram functionally showing the online gift-presentation system according to Embodiment 1 of the present invention.

This online gift-presentation system has, as shown in FIG. 1, a client 1 as a gift-presenter and a client 4 as a gift-receiver connected to a network INT such as the Internet or any other commercial communication network through a telephone line, and further has a server system 2 connected to the network INT so that online gift-presentation of contents can be realized. The server system 2 is connected to a credit authorizing/settling server 3 via a communication line and executes the operation for requesting/receiving credit authorization for the purchaser with the credit authorizing/settling server 3 and for settling accounts for the purchaser therewith through online. It should be noted that, in an actual system, a number of clients are connected to the network INT, but it is assumed herein that the client 1 indicates a gift-presenter as a representative thereof and a client 4 indicates a gift-receiver as a representative thereof.

The client 1 as a gift-presenter comprises, as shown in FIG. 1, a contents selection/gift-presentation data entry section 11, a gift-presentation requesting section 12, a contents/gift-presentation number receiving section 13, and a gift distributing section 14. Through the contents selection/gift-presentation data entry section 11, a user selects desired contents from an electronic market formed on the network INT and enters address data for a gift-receiver as well as user data as a gift-presenter to request gift-presentation. The user data indicates herein data such as a credit number required for payment for the purchase with a credit card and a name registered in a credit company.

The gift-presentation requesting section 12 makes a request for gift-presentation to the server system 2 using the data inputted through the contents selection/gift-presentation data entry section 11, and receives a result of authorization for the request. The contents/gift-presentation number receiving section 13 receives encoded contents data with the gift-presentation number from the server system 2 (a contents database 23 will be described later). The gift distributing section 14 distributes (presents) gift-presentation data, namely the encoded contents data with the gift-presentation number to the client 4 as a gift-receiver according to data for the gift-receiver address inputted by the contents selection/gift-presentation data entry section 11.

The client 4 as a gift-receiver comprises, as shown in FIG. 1, a receiving section 41, a key requesting section 42, a contents decoding section 43, a decoding-completion reporting section 44, and a contents accumulating section 45. The receiving section 41 receives the encoded contents data with the gift-presentation number distributed by the gift distributing section 14 of the client 1 as a gift-presenter, and also receives data for a decoding key transmitted in response to the request for the key from the key requesting section 42. The key requesting section 42 makes a request for the key, in order to decode the contents distributed from the client 1 as a gift-presenter, to the server system 2 using the gift-presentation number added to the contents.

The contents decoding section 43 fetches the contents and the decoding key therefor from the receiving section 41 and decodes the encoded contents using the decoding key. The decoding-completion reporting section 44 transmits a report on completion of decoding to the server system 2 at a time point of completion of the decoding operation by the contents decoding section 43. The contents accumulating section 45 accumulates therein the contents decoded by the contents decoding section 43.

It should be noted that not only encryption technology but also security technology on electronic commerce are applied in communications among the clients 1, 4 and the server system 2 although the figure and detailed description thereof are omitted herein. As an example of the security technology, SET (Secure Electronic Transactions) is preferable, but it is not necessary to restrict to the SET.

The server system 2 comprises, as shown in FIG. 1, an authorizing section 21, a contents/key distributing section 22, a contents database 23, a key database 24, a contents encoding section 25, an accounting section 26, and an accounting-log database 27. The authorizing section 21 issues authorization to a user according to a request for gift-presentation sent by the gift-presentation requesting section 12 in the client 1 as a gift-presenter. This authorizing section 21 executes, when credit authorization is required, the processing for requesting authorization for the user to the credit authorizing/settling server 3 and receives authorization therefrom, and sends back a result of the authorization to the gift-presentation requesting section 12.

The contents/key distributing section 22 instructs, when the request for purchase is authorized by the authorizing section 21 (indicated with OK in the figure), the contents database 23 to distribute the contents and the gift-presentation number, and also instructs the key database 24 to distribute a key according to the request for the key from the key requesting section 42 (of client 4 as a gift-receiver). The contents encoding section 25 encodes contents data provided from a contents vendor through a communication line or the like, outputs the encoded contents to the contents database 23, and also outputs data for a decoding key for decoding the contents to the key database 24. This contents encoding section 25 outputs data indicating a correlation between the encoded contents and the decoding key to the contents database 23.

The contents database 23 registers therein encoded contents data supplied from the contents encoding section 25 and also registers therein a correlation between the contents and the decoding key. This contents database 23 also registers therein a gift-presentation number relating to the registered contents correlated to each contents. Then, the contents database 23 distributes specified encoded contents data and the gift-presentation number to the client 1 as a gift-presenter (contents/gift-presentation number receiving section 13) according to the instruction for distribution from the contents/key distributing section 22.

The key database 24 registers therein data for decoding keys supplied from the contents encoding section 25. This key database 24 distributes the data for the decoding key registered in correlation to the gift-presentation number to the client 4 as a gift-receiver (receiving section 41) according to the instruction for distribution from the contents/key distributing section 22. The accounting section 26 instructs the accounting-log database 27 to put an account on the gift-presenter (user of the client 1 as a gift-presenter) according to the report on completion of decoding transmitted from the client 4 as a gift-receiver (decoding-completion reporting section 44). The accounting-log database 27 registers therein account data for each purchaser according to the instruction for accounting by the accounting section 26. This accounting-log database 27 transmits account data for settling accounts to the credit authorizing/settling server 3 for, for instance, each specified period of time.

Figure 2:
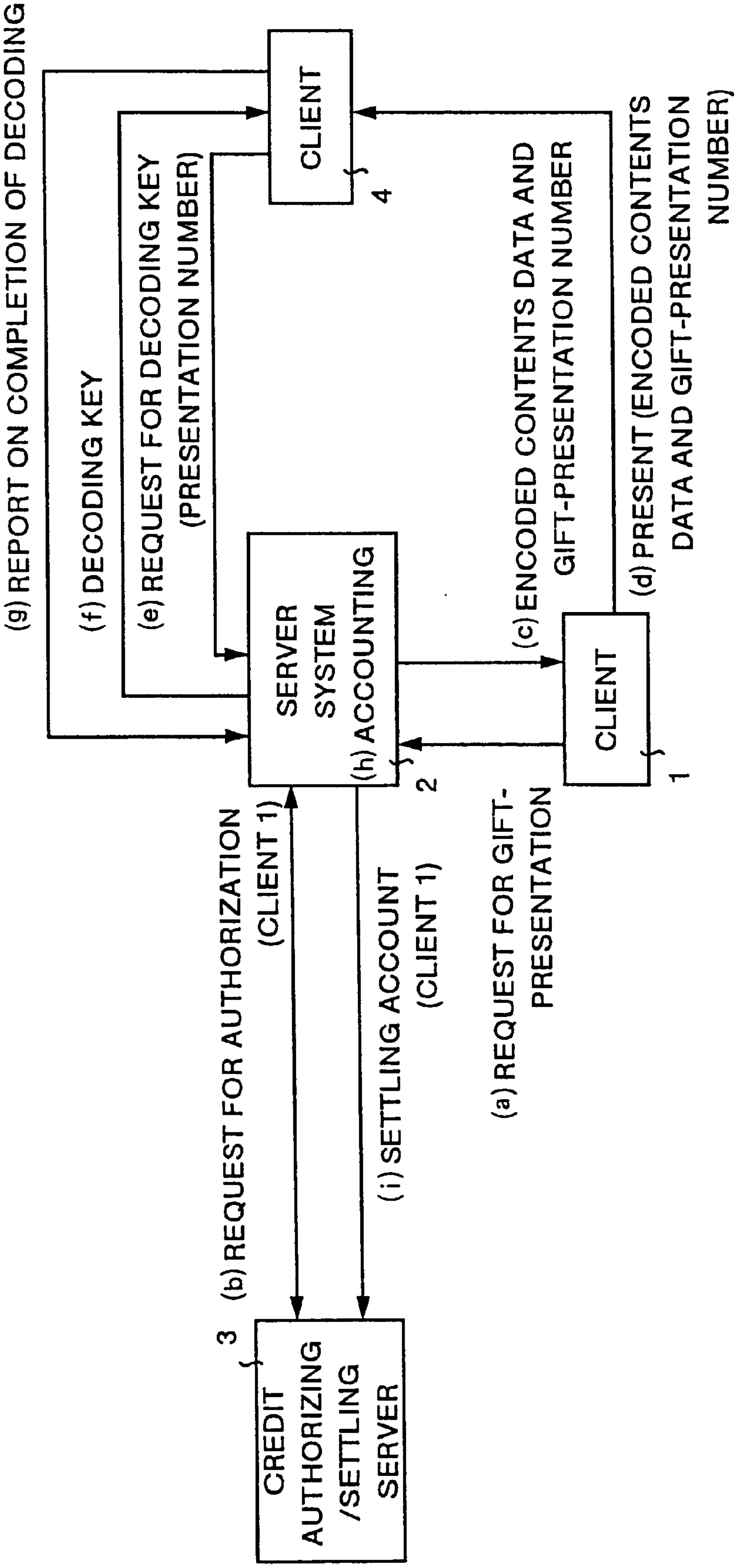
FIG. 2 is a view for explaining a relation among the different units in the online gift-presentation system according to Embodiment 1.
Figure 3:
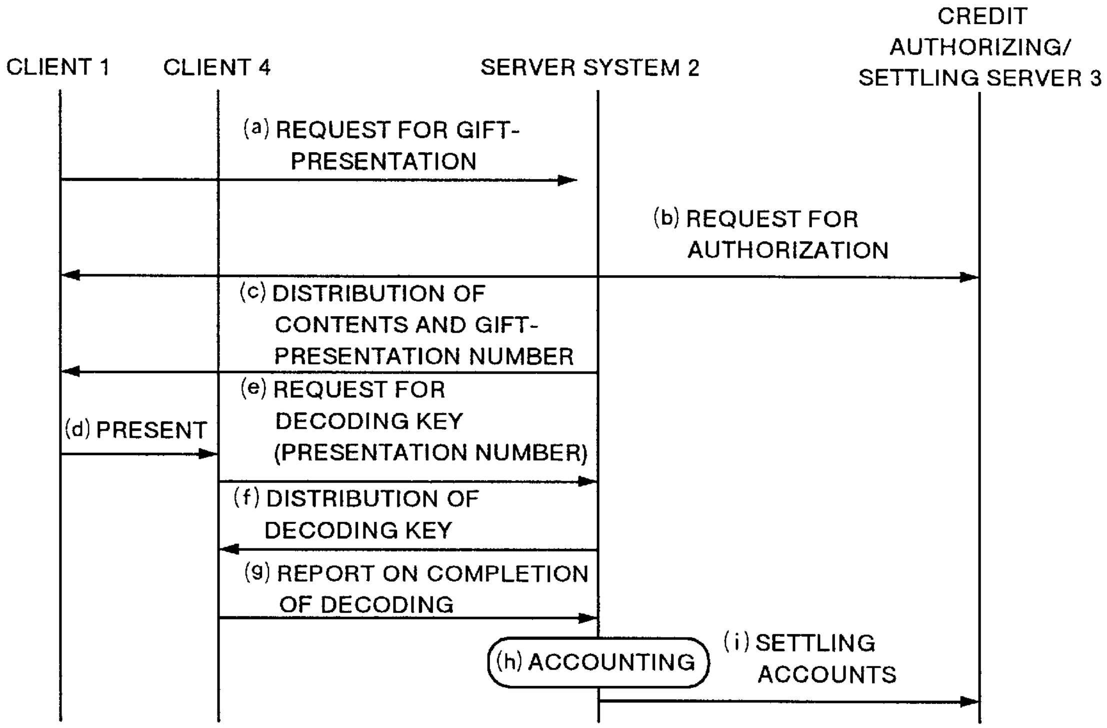
FIG. 3 is a view for explaining an example of an operational sequence in the online gift-presentation system according to Embodiment 1.

In the next, description is made for an operational sequence. FIG. 2 is a view for explaining a relation among of the different units in the online gift-presentation system according to Embodiment 1, and FIG. 3 is a view for explaining an example of an operational sequence in the online gift-presentation system according to Embodiment 1.

This online gift-presentation system comprises, as shown in FIG. 2, a plurality of clients (clients 1, 4 are used herein as an example) and the server system 2. The credit authorizing/settling server 3 is a section of the system under controls by a credit company, so that the credit authorizing/settling server 3 is excluded from the online gift-presentation system according to the present invention.

In FIG. 1, the client 1 is a terminal equipment as a gift-presenter, and the client 4 is a terminal equipment as a gift-receiver. When the client 1 is to present contents as a gift to the client 4, the client 1 makes a request for gift-presentation to the server system 2 (a). Then, the server system 2 executes, in order to get authorization for the client 1 as a gift-presenter in response to the request for gift-presentation, a processing for requesting authorization to the credit authorizing/settling server 3 (b).

As a result, when the client 1 is authorized and presentation of the gift is allowed, the server system 2 distributes encoded contents as an object for a gift and a gift-presentation number used for identifying the contents to the client 1 (c). Then the client 1 as a gift-presenter transmits the encoded contents and the gift-presentation number received from the server system 2 to the client 4 (d). The processing for online gift presentation is executed as described above.

The client 4 as a gift-receiver can not use the encoded contents as it is because of the encryption thereof, and for this reason the client 4 requests a decoding key for decoding the encoded contents to the server system 2. Therefore, the client 4 as a gift-receiver requests a decoding key to the server system 2 using the gift-presentation number transmitted with encoded contents (e). The server system 2 fetches a decoding key correlated to the gift-presentation number transmitted with the key request and transmits it to the client 4 (f).

The client 4 as a gift-receiver decodes, when having received the decoding key from the server system 2, the encoded contents using the decoding key, and transmits a report on completion of decoding to the server system 2 (g). The server system 2 makes determination, when having received the report on completion of decoding, that the processing for gift presentation has completed, and executes the processing for accounting for the user as a gift-presenter (h). Then, settlement of accounts on the client 1 as a gift-presenter is executed on the date of settlement arranged with the credit company providing controls over the credit authorizing/settling server 3 (i).

Figure 4:
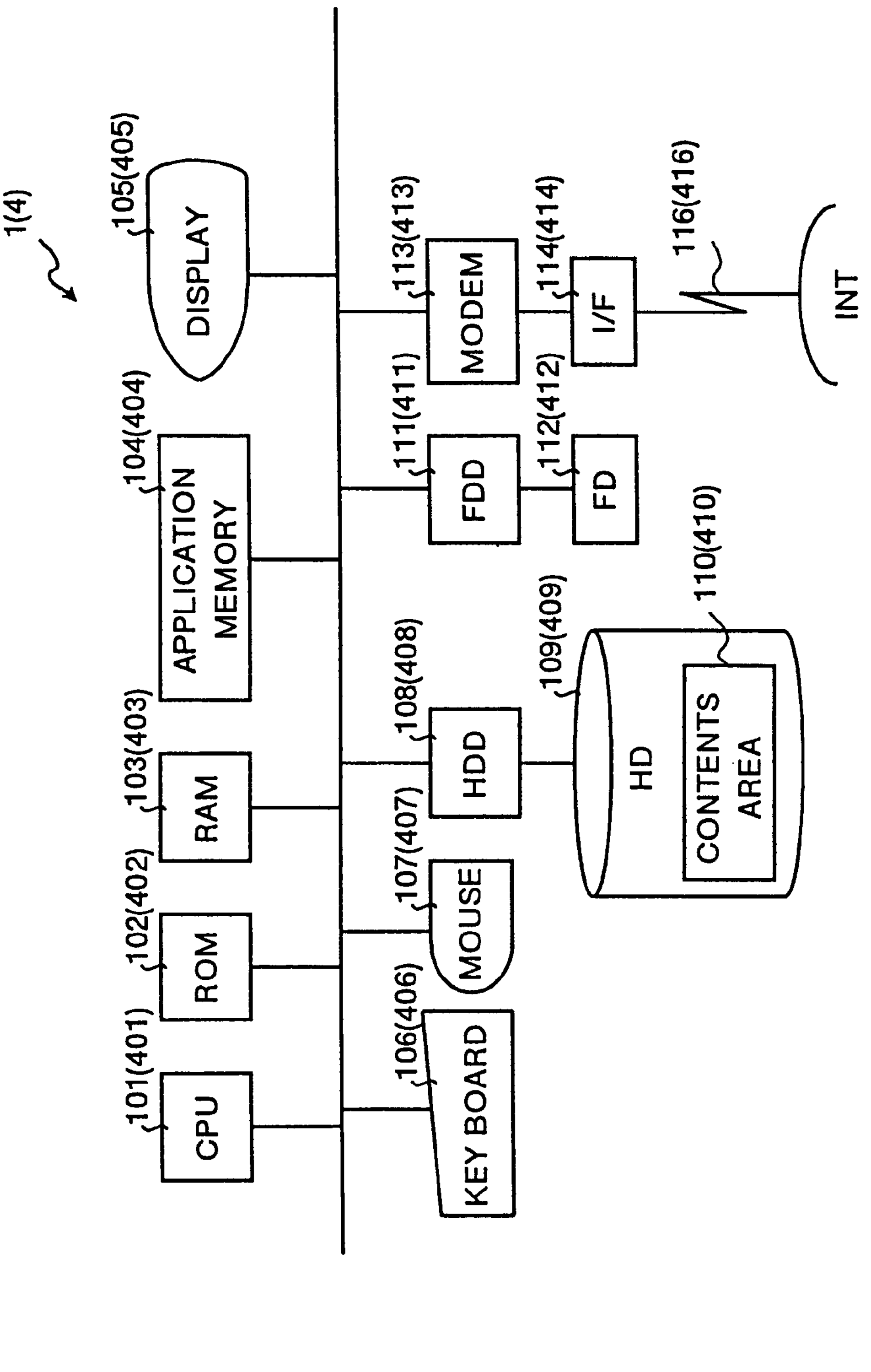
FIG. 4 is a block diagram showing hardware of a client in the online gift-presentation system according to Embodiment 1.

In the next, description is made for functions of the online gift-presentation system from a point of hardware thereof. At first, description is made for the clients 1 and 4. FIG. 4 is a block diagram showing hardware configuration of a typical client in the online gift-presentation system according to Embodiment 1.

FIG. 4 is a block diagram showing hardware of the client 1 in the online gift-presentation system according to Embodiment 1. In FIG. 4, the components constituting the client 1 are indicated by the reference numerals 101 to 116, while the components constituting the client 4 are indicated by the reference numerals 401 to 416 each provided between round brackets. The client 1 as a gift-presenter comprises, as shown in FIG. 4, units such as a CPU 101, a ROM 102, a RAM 103, an application memory 104, a display 105, a keyboard 106, a mouse 107, a hard disk drive (HDD) 108, a hard disk (HD) 109, a floppy disk drive (FDD) 111, a floppy disk (FD) 112, a modem 113, and an interface (I/F) 114, and the units are connected to each other through a bus.

Also, the client 4 as a gift-receiver comprises, as shown in FIG. 4, units such as a CPU 401, a ROM 402, a RAM 403, an application memory 404, a display 405, a keyboard 406, a mouse 407, a hard disk drive (HDD) 408, a hard disk (HD) 409, a floppy disk drive (FDD) 411, a floppy disk (FD) 412, a modem 413, and an interface (I/F) 414, and the units are connected to each other through a bus.

As the client 1 and the client 4 have the same hardware configuration, description is made hereinafter for the client 1 as a representative thereof. The CPU 101 provides controls over operations of the entire client 1 with the help of various types of programs stored in the ROM 102 and the application memory 104. This CPU 101 provides controls over the functions shown in FIG. 1, namely an entire operation of the contents selection/user data entry section 11, an operation for requesting gift-presentation by the gift-presentation requesting section 12, a receiving operation by the contents/gift-presentation number receiving section 13, and a distributing operation by the gift distributing section 14 or the like. It should be noted that, in the client 4, the CPU 401 provides controls over a receiving operation by the receiving section 41, a requesting operation by the key requesting section 42, a decoding operation by the contents decoding section 43, a reporting operation by the decoding-completion reporting section 44, and an accumulating operation to the accumulating section 45 or the like.

The ROM 102 stores therein programs such as an operating system (OS) required to operate the CPU 101. The RAM 103 is used as a work area for the CPU 101. The application memory 104 stores therein an application program for executing the operation for presenting a gift-contents according to Embodiment 1 (refer to FIG. 9 described later). It should be noted that, in the client 4, the application memory 404 stores therein an application program for executing the operation for receiving the gift-contents (refer to FIG. 10 described later) according to Embodiment 1.

The display 105 has a screen on which is displayed a menu for selection of contents to be presented, contents and other items. The keyboard 106 has keys for entry of characters, and the mouse 107 is a tool for pointing at any target on the screen of the display 105. The HDD 108 provides controls over reading/writing data from/in the HD 109 according to the controls by CPU 101. The HD 109 corresponds to the accumulating section 15 and stores (accumulates) therein data written under controls by the HDD 108. Insured in the HD 109 is a contents area 110 for accumulating therein contents and the gift-presentation numbers.

The FDD 111 provides controls over reading/writing data from/in the FD 112 according to the controls by CPU 101. The FD 112 corresponds to the accumulating section 15 and stores (accumulates) therein data written under controls by the FDD 111. The modem 113 is connected to the network INT via the I/F 114 and performs modulation or demodulation for communications. The I/F 114 is connected to the network INT via a communication line 116 and works as an interface between the network INT and the internal sections of the system.

Figure 5:
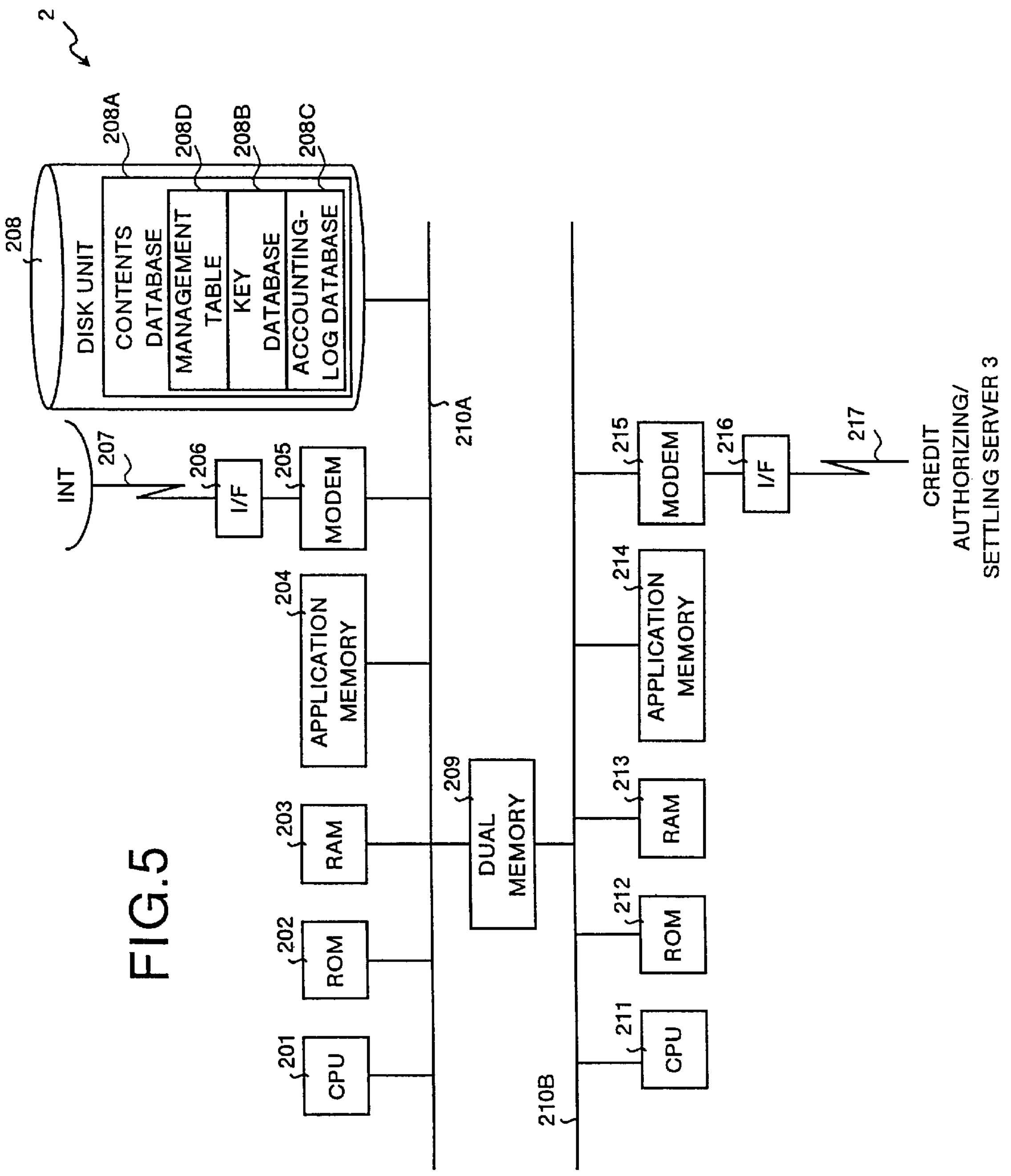
FIG. 5 is a block diagram showing hardware of a server system in the online gift-presentation system according to Embodiment 1.

In the next, description is made for the server system 2. FIG. 5 is a block diagram showing hardware of the server system 2 in the online gift-presentation system according to Embodiment 1. This server system 2 is divided, as shown in FIG. 5, into sections for executing the processing on the side of network INT and for executing the processing with the credit authorizing/settling server 3.

The network INT side section as one of the sections comprises units such as a CPU 201, a ROM 202, a RAM 203, an application memory 204, a modem 205, an I/F 206, and a disk unit 208, and the units are connected to a bus 210A. The credit authorizing/settling server 3 as the other section comprises units such as a CPU 211, a ROM 212, a RAM 213, an application memory 214, a modem 215, and an I/F 216, and the units are connected to a bus 210B. In addition, the buses 210A and 210B are connected to each other through a dual memory 209 so that the buses can reciprocally communicate to each other.

At first, in the of the network INT side section, the CPU 201 provides controls over operations of the entire server system 2 in response to operations of the client 1 by various types of programs stored in the ROM 202 and the application memory 204. This CPU 201 provides controls over the functions shown in FIG. 1, namely, an authorizing operation by the authorizing section 21, a distributing operation by the contents/key distributing section 22, and an encoding operation by the contents encoding section 26 or the like.

The ROM 202 stores therein programs such as an operating system (OS) required for the CPU 201 to operate in the network INT side. The RAM 203 is used as a work area for the CPU 201. The application memory 204 stores therein an application program for executing operations for a transaction of contents according to Embodiment 1 (refer to FIG. 9, FIG. 10 described later).

The disk unit 208 has a contents database 208A corresponding to the contents database 23, a key database 208B corresponding to the key database 24, and an accounting-log database 208C corresponding to the accounting-log database 27. This disk unit 208 provides controls over reading/writing data from/in the contents database 208A, key database 208B, and accounting-log database 208C according to the controls by the CPU 201. It should be noted that the contents database 208A has a management table 208D. This management table 208D stores therein, in correlation to the contents, the contents number, the gift-presentation number, and the user ID correlated to each other.

The modem 205 is connected to the network INT via the I/F 206 and performs modulation or demodulation for communications. The I/F 206 is connected to the network INT via a communication line 207 and works as an interface between the network INT and the internal section of the system.

Then, in the side of credit authorizing/settling server 3, the CPU 211 provides controls over operations of the entire server system 2 in response to operations of the credit authorizing/settling server 3 by various types of programs stored in the ROM 212 and the application memory 214. This CPU 211 provides controls over the functions shown in FIG. 1, namely an operation for authorization by the authorizing section 21, and an operation for settlement of accounts by the accounting-log database 27 (208C) or the like.

The ROM 212 stores therein programs such as an operating system (OS) required to operate the CPU 211 of credit authorizing/settling server 3. The RAM 213 is used as a work area for the CPU 211. The application memory 214 stores therein an application program for executing the operations of authorization/settlement of accounts according to Embodiment 1 (refer to FIG. 9 and FIG. 10 described later).

The modem 215 is connected to the credit authorizing/settling server 3 via the I/F 216 and performs modulation or demodulation for communications. The I/F 216 is connected to the credit authorizing/settling server 3 via a communication line 217 and works as an interface between the credit authorizing/settling server 3 and the internal section of the system.

In the next, description is made for the contents database 208A. FIG. 6 is a view for explaining contents of the contents database 208A. This contents database 208A contains contents data (encoded data) provided by contents vendors. To describe more specifically, contents are classified, as shown in FIG. 6, into each genre, and all the contents are commonly correlated to each genre. Contents data in each genre is stored in the database correlated to the types of contents.

In the next, description is made for a relation between the contents database 208A and the key database 208B. FIG. 7 is a view for explaining a method of managing a correlation between the contents database 208A and the key database 208B according to Embodiment 1. In FIG. 7, the reference numerals CD1, CD2, CD3 . . . indicate encoded contents data respectively, and the reference numerals KD1, KD2, KD3 . . . indicate data for each decoding key respectively.

Allocated to each of contents in the server system 2 is a number for management of the contents, and a correlation between contents and a decoding key is managed with the number. More specifically, when numbers are managed, for instance, based on a system of 1, 2, 3 . . . , as shown in FIG. 7, contents No. 1 is allocated to a correlation between contents data CD1 and decoding key data KD1, contents No. 2 is allocated to a correlation between contents data CD2 and decoding key data KD2, and further contents No. 3 is allocated to a correlation between contents data CD3 and decoding key data KD3.

For instance, when the contents No. 1 is requested for gift-presentation, because the encoded contents data CD1 is correlated to the decoding key data KD1, the contents data CD1 is distributed to a gift-presenter in response to the request for gift-presentation therefrom and the decoding key data KD1 is distributed to the gift-receiver in response to the request for the key therefrom.

Figure 8A:
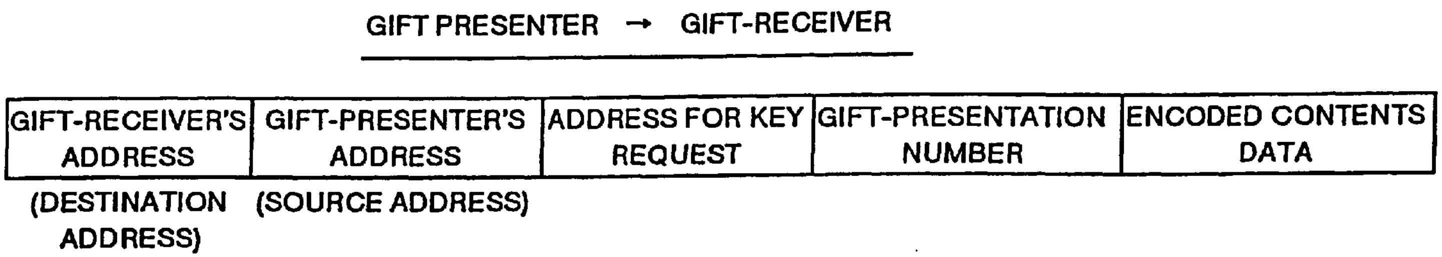
FIGS. 8A to 8C are views for explaining an example of the format of the data to be reported in the system according to Embodiment 1.
Figure 8B:
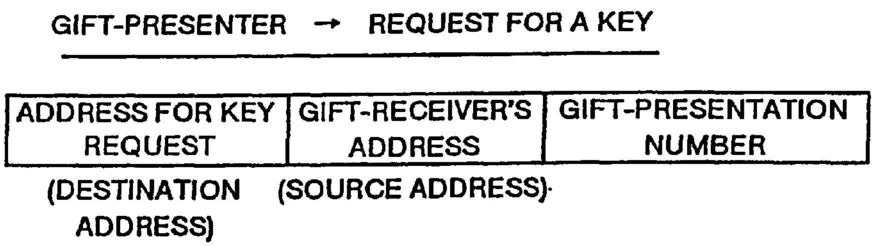
Figure 8C:
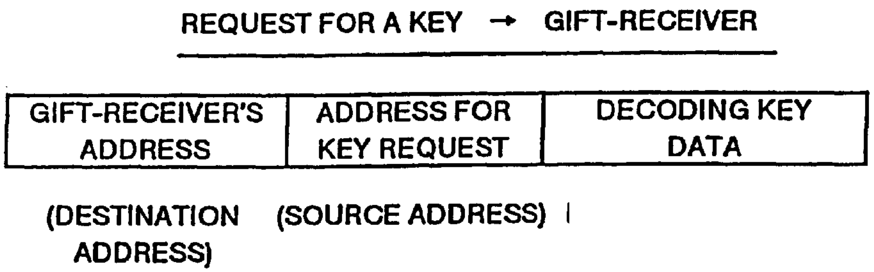

In the next, description is made for data to be reported in the online gift-presentation system. FIGS. 8A to 8C are views for explaining a format example of data to be reported in the system according to Embodiment 1. Sent to the client 4 as a gift-receiver from the client 1 as a gift-presenter is a mail in a mail format shown in FIG. 8A. The format of this mail consists of, as shown in FIG. 8A, a gift-receiver's address (destination address), a gift-presenter's address (source address), an address to which a key-request is to be made (address of the server system 2), a gift-presentation number, and encoded contents data as a main body of the mail.

Sent to the server system 2 to which the key is to be requested from the client 4 as a gift-receiver is a mail in a mail format shown in FIG. 8B. The format of this mail consists of, as shown in FIG. 8B, an address to which the key-request is to be made (destination address), the gift-receiver's address (source address), and the gift-presentation number.

Also, sent to the client 4 as a gift-receiver from the server system 2 to which the key has been requested is a mail in the mail format shown in FIG. 8C. The format of this mail consists of, as shown in FIG. 8C, the gift-receiver's address (destination address), the address to which the key-request has been made (source address), and data for the decoding key.

Figure 9:
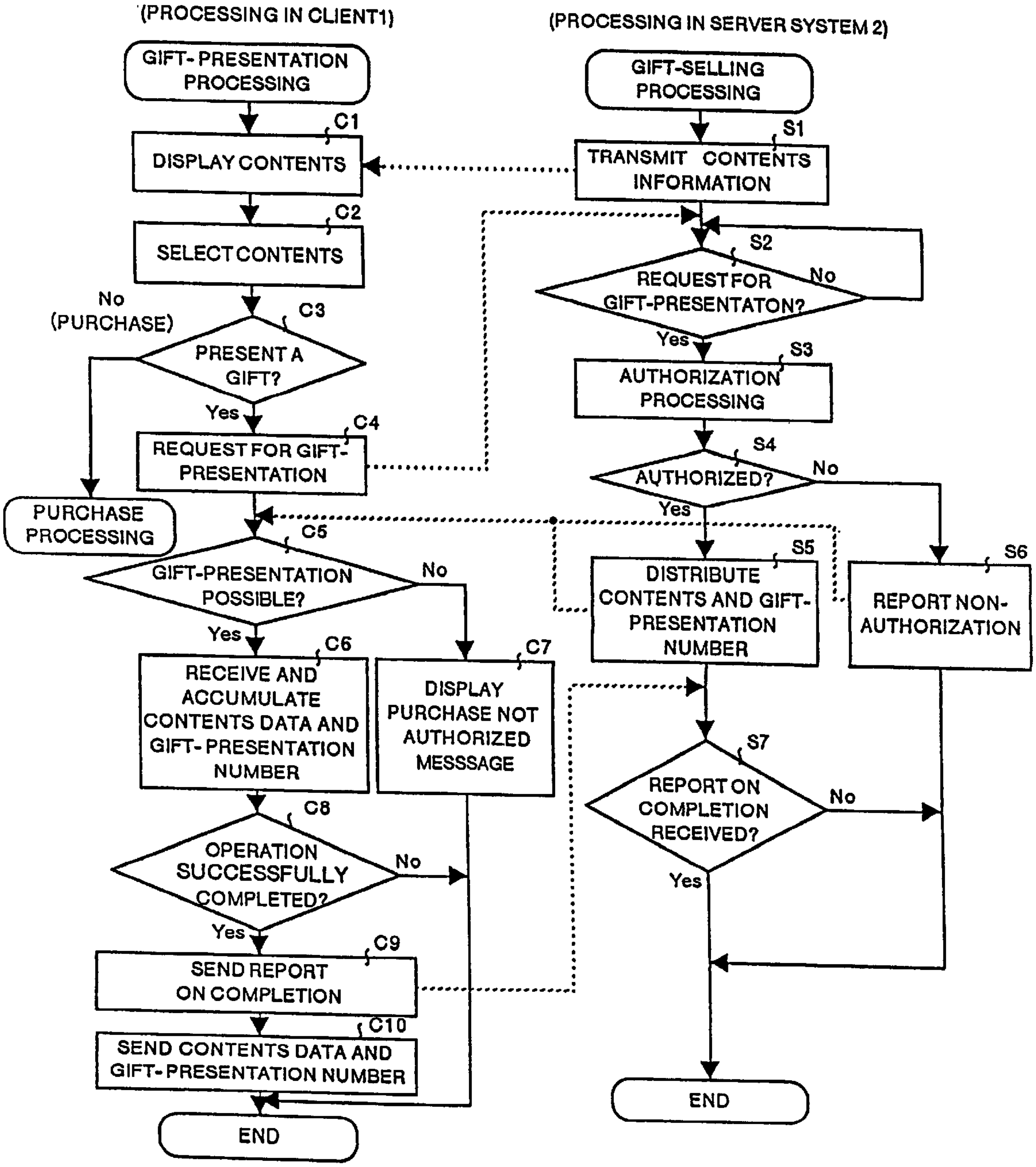
FIG. 9 is a flow chart for explaining operations according to Embodiment 1.
Figure 10:
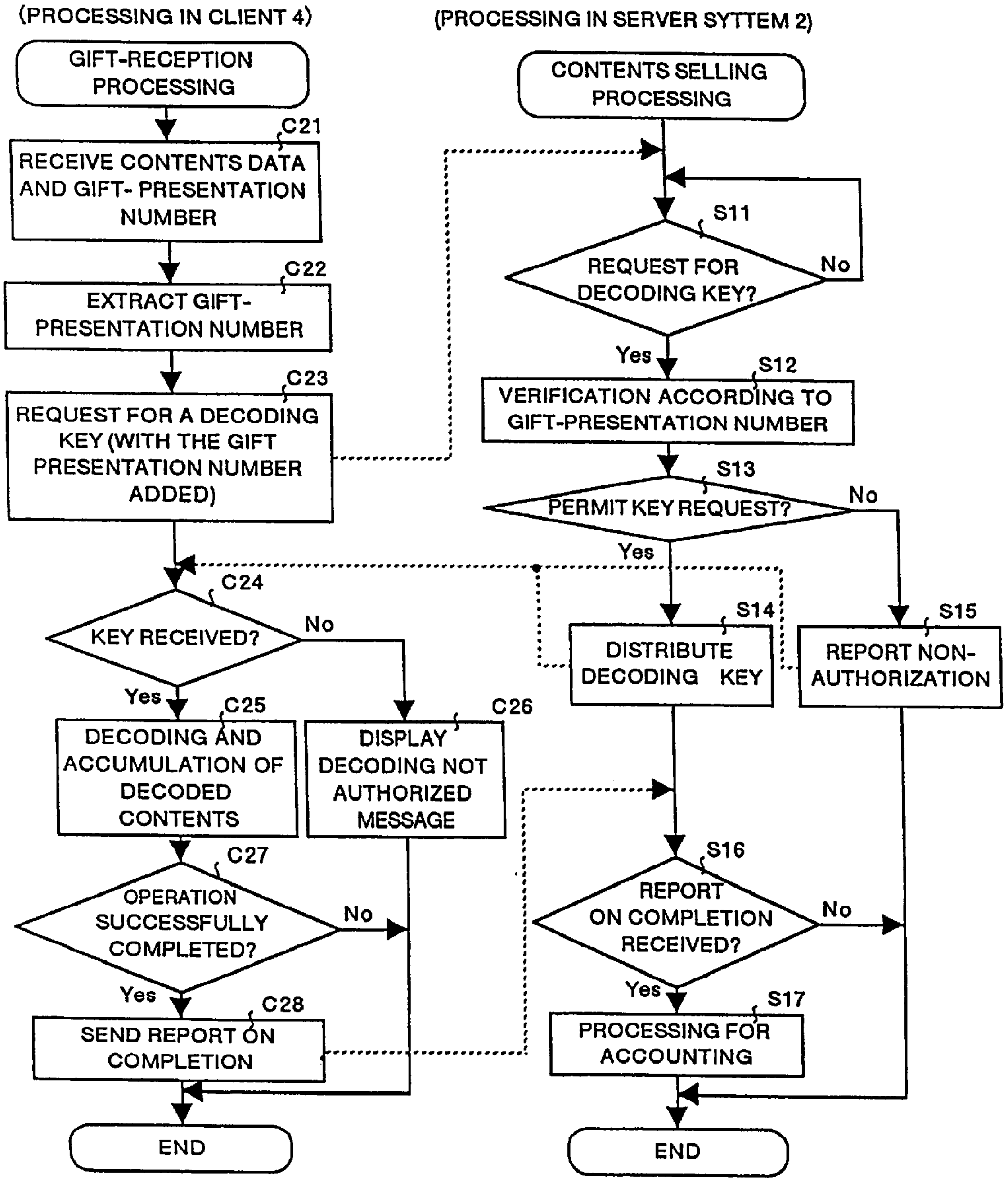
FIG. 10 is an another flow chart for explaining operations according to Embodiment 1.

In the next, description is made for operations. FIG. 9 and FIG. 10 are flow charts which explain the operations according to Embodiment 1, FIG. 11 to FIG. 13 are views each for explaining how a screen is changed with execution of the processing for online shopping, FIG. 14 is a view for explaining contents of the management database according to Embodiment 1, and FIG. 15 is a view showing an example of an accounting-log database 208C. FIG. 9 shows operations involved in making a request for presenting a gift form the client 1 as a gift-presenter to the server system 2, and FIG. 10 shows operations involved in accepting a gift by the client 4 as a gift-receiver form the server system 2.

The server system 2 forms a virtual electronic market with digital contents on the network INT. When the market is formed, and if the client 1 as a gift-presenter accesses the electronic market through the network INT, contents information is transmitted from the server system 2 to the client 1 (step S1). The electronic market is then displayed on the display 105 of the client 1 as a gift-presenter according to the contents information. When displayed, the electronic market shows various types of contents thereon (step C1).

Figure 11A:
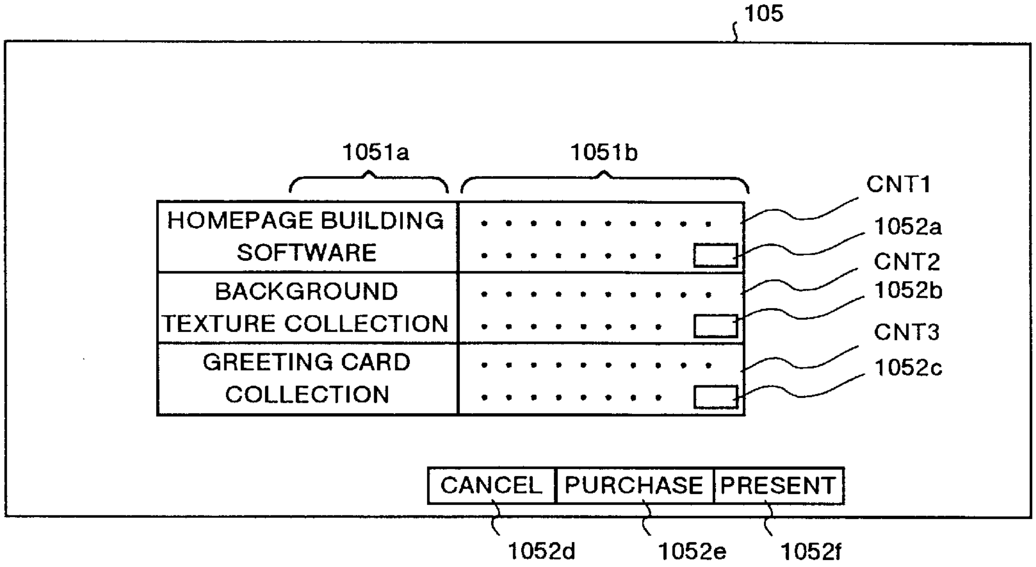
FIGS. 11A and 11B are views for explaining transitions of a display screen during execution of the processing for online shopping according to Embodiment 1.

FIG. 11A shows an example of the display of electronic market on the display 105. A title column 1051*a* for contents and a contents column 1051*b* are displayed on the display 105 in correlation to each other. Each contents in the contents column 1051*b* has check boxes 1052*a*, 1052*b*, and 1052*c* used for selection of the contents that a user desires to purchase or for cancellation of the purchase provided therein. Herein three contents CNT1, CNT2, and CNT3 appear thereon, and the check boxes 1052*a*, 1052*b*, and 1052*c* are correlated to the contents respectively.

Selectably displayed in the lower part of the screen of the display 105 are a cancel icon 1052*d* for canceling an operation for contents selection, a purchase icon 1052*e* for shifting to the operation for purchase according to a check mark provided in any check column, and a present icon 1052*f* for shifting to the operation for gift-presentation according to a check mark provided in any check column.

For example, when the check box 1052*a* in the contents CNT1 is checked (selected) (step C2) and the purchase icon 1052*e* is selected using the keyboard 106 or the mouse 107 (step C3), data for the selected contents and user data are transmitted to the server system 2, and then the processing for purchasing is proceeded. Also, when the present icon 1052*f* is selected using the keyboard 106 or the mouse 107 (step C3), data for the selected contents and user data are transmitted to the server system 2, and then the processing for gift-presentation is carried out. However, before this transmission is executed, entry of the user data is needed.

Figure 11B:
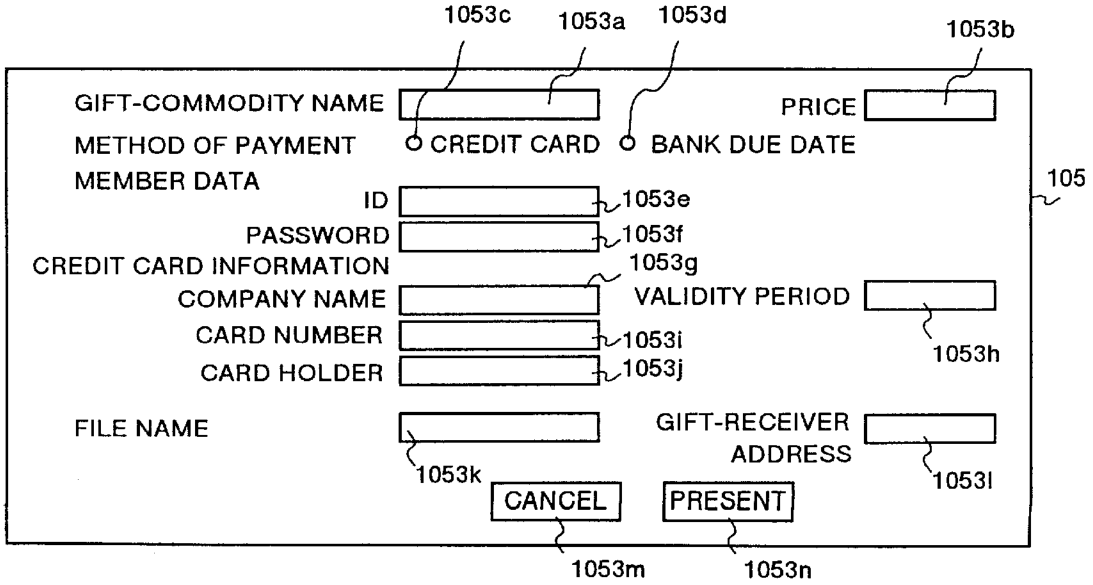

FIG. 11B shows a screen for user-data entry. On the display 105, for entering user data, there are displayed a screen for entry of user data with a display box 1053*a* for a gift-commodity name; a display box 1053*b* for a price of the commodity; a click box 1053*c* for clicking thereon for a credit card as well as a click box 1053*d* for clicking thereon for a due date of a bank as one of methods of payment to be selected; a dialog box 1053*e* for entry of a user ID as well as a dialog box 1053*f* for entry of a password each as member data; a dialog box 1053*g* for entry of a company name, a dialog box 1053*h* for entry of the period of validity of a card, a dialog box 1053*i* for entry of a card number, and a dialog box 1053*j* for entry of the name of a card holder each as credit card data; a dialog box 1053*k* for specifying a file name to store the data therein to a disk, and a dialog box 1053*l* for entry of a gift-receiver address.

Further, displayed in the lower part of the screen are a cancel icon 1053*m* for canceling the entry operations of the user data and a present icon 1053*n* for instructing to send the request for purchase according to the entered user data. When the user enters the requirements onto the user-data entry screen and clicks on the present icon 1053*n* to request the gift-presentation (step C4), the standby state is effected for waiting for a result of verification for the authorization.

The server system 2 executes, when having received a request for gift-presentation from the client 1 as a gift-presenter (step S2), the processing for authorization according to the user data sent with the gift-presentation request (step S3). When authorization for the gift-presentation is given as a result of verification for the authorization (step S4), the contents selected by the user through the client 1 as a gift-presenter is read out from the contents database 208A, and the read-out contents is distributed thereto via the network INT with the gift-presentation number, obtained by referring to the management table 208D, for identifying the contents added to the contents (step S5).

After the requested contents and the gift-presentation number are distributed to the client 1 as a gift-presenter as described above, a standby state for waiting for arrival of a report on completion of reception is effected. Also when the request for purchase is not authorized as a result of verification for the authorization in step S3 (step S4), a report that the gift-presentation is not authorized is transferred to the client 1 as a gift-presenter, and then this transaction is terminated (step S6).

When the contents is distributed from the server system 2 to the client 1 as a gift-presenter as described above, the management table 208D stores therein management contents as shown in FIG. 14. Namely, assuming that any number (a mark may be used) is given to each of contents and a gift-presentation number is generated to each of the contents respectively, as shown in FIG. 14, the gift-presentation number and the user ID (address may also be used) for identifying a purchaser are stored therein for management correlated to each other for each contents number. Service information is also stored therein in correlation to each contents number.

The example in FIG. 14 shows that three units of contents with contents No. 1 are sold. In contents No. 1, gift-presentation No. CD1-1 and No. CD1-2 are correlated to user IDs AAA and CCC respectively for management. Accordingly, a type of purchase made by other user ID of BBB does not indicate that it is a gift, but indicates that it is just an ordinary purchase. Similarly, two units of contents with contents No. 2 are sold. In contents No. 2, gift-presentation No. CD2-1 is correlated to a user ID of DDD for management. Accordingly, a type of purchase made by the other user ID of EEE does not indicate that it is a gift, but indicates that it is just an ordinary purchase. Contents No. 3 and thereafter can also indicate either a gift or ordinary purchase in the same way, but the figure and the description thereof are omitted herein. For example, assuming that the current gift-presenter has user ID of AAA, the management table 208D shows that the contents with contents No. 1 is purchased thereby and that the gift-presentation number for the contents is CD1-1.

Figure 12A:
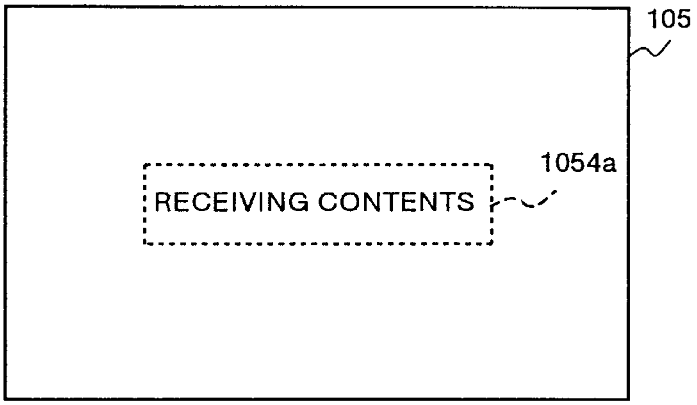
FIGS. 12A to 12C are is views for explaining transitions of a display screen during execution of the processing for online shopping according to Embodiment 1.

The client 1 as a gift-presenter receives, when the request for gift-presentation is authorized by the server system 2 and the requested contents and the gift-presentation number are transmitted (step C5), the contents and the gift-presentation number, and then executes the operation for accumulating them in the contents area 110 of the HD 109 (step C6). If an operation of receiving the contents is being executed at this point of time, as shown in FIG. 12A, a message 1054*a* like "Receiving contents" appears on the display 105. On the other hand, when a report that the purchase is not authorized (step C5) is received, a message indicating that the purchase is not authorized appears on the display 105 (step C7), and this transaction is terminated.

Figure 12B:
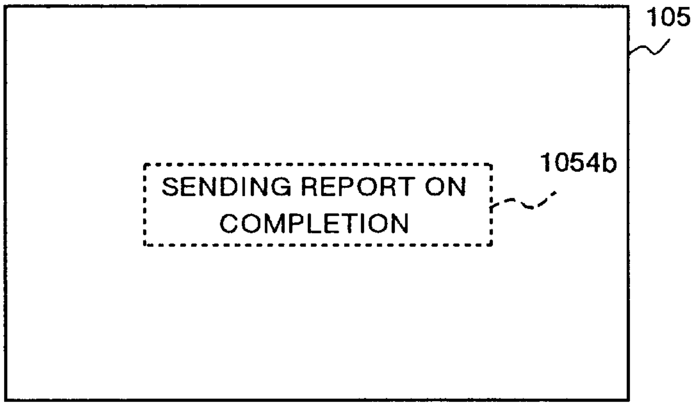

In step C6, when the operations for receiving and accumulating the contents and the gift-presentation number are finished, determination is made as to whether the operation for receiving the contents has successfully been completed or not (step C8). When it is determined that the contents has successfully been received (step C8), the client 1 sends a report on completion of the operation for receiving the contents to the server system 2 (step C9). If an operation for sending a report on completion of reception is being executed at this point of time, as shown in FIG. 12B, a message 1054*b* like "Sending report on completion of purchase" appears on the display 105. In this case, the server system 2 ensures the arrival of the report on completion of reception (step S7), and the communications with the client 1 as a gift-presenter is terminated.

Figure 12C:
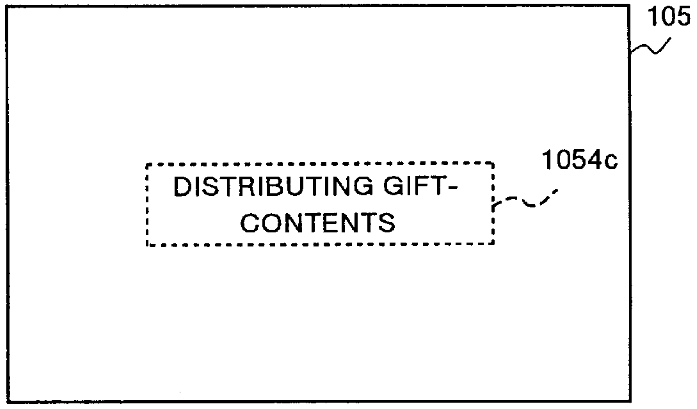

Then, the client 1 as a gift-presenter reads out, in order to execute the processing for distributing the gift to the client 4 as a gift-receiver, the encoded contents and the gift-presentation number from the contents area 110, prepares a mail in the format shown in FIG. 8A using the gift-receiver address having already been entered, and executes the processing for distributing the gift thereto (step C10). Herein, if an operation for distributing the gift is being executed at this point of time, as shown in FIG. 12C, a message 1054*c* like "Distributing gift-contents" appears on the display 105. Also when it is determined that the operation for receiving the contents could not successfully be completed due to incapability of communications or for some other reasons, this transaction is terminated and it is considered that no transaction took place at all.

Figure 13A:
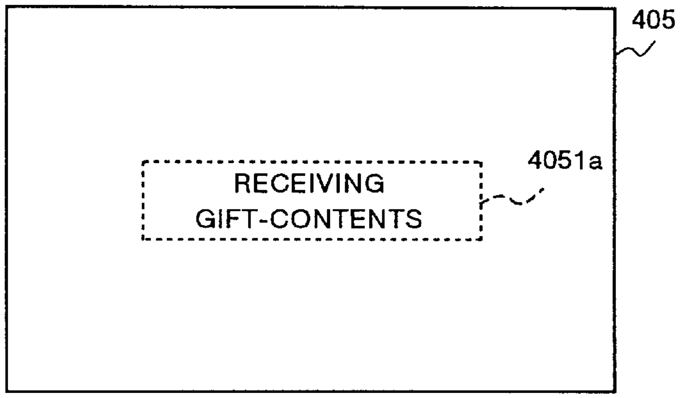
FIGS. 13A to 13C are views for explaining transitions of a display screen during execution of the processing for online shopping according to Embodiment 1.

Then, the processing for gift-presentation is executed between the client 4 as a gift-receiver and the sever system 2. The client 4 as a gift-receiver executes, when the encoded contents and the gift-presentation number are transmitted from the client 1 as a gift-presenter, the processing for receiving the contents and accumulating it in the contents area 410 of the HD 409 (step C21). Herein, if an operation for receiving the gift-contents is being executed at this point of time, as shown in FIG. 13A, a message 4051*a* like "Receiving gift-contents" appears on the display 405.

The client 4 as a gift-receiver extracts, after the received data is temporarily accumulated in the contents area 410 as described above, only the gift-presentation number from the received data (step C22), prepares the mail shown in FIG. 8B using the gift-presentation number to the server system 2, and makes a request for the key through the mail (step C23). Then, a standby state for waiting for arrival of the key thereto is effected.

The sever system 2 executes, when having received the key request from the client 4 as a gift-receiver (step S11), the processing for verification according to the gift-presentation number sent with the key request by referring to the management table 208D (step S12). When the key request is permitted as a result of the verification (sep S13), data for the desired decoding key is read out from the key database 208B according to the correlation between the gift-presentation number and the contents as well as to the correlation between the contents and the decoding key each provided by the management table 208D. The decoding key correlated to the gift-presentation number is distributed to the client 4 as a gift-receiver as described above (step S14). For the distribution of this decoding key, the mail shown in FIG. 8C is prepared, and is distributed from the sever system 2 to the client 4 as a gift-receiver.

After the decoding key is distributed to the client 4 as a gift-receiver, a standby state for waiting for arrival of the report on completion of decoding is effected. On the other hand, when the key distribution is not authorized as a result of the verification in step S12 (step S14), the report that the key distribution is not authorized is transmitted to the client 4, and this transaction is terminated (step S15).

Figure 13B:
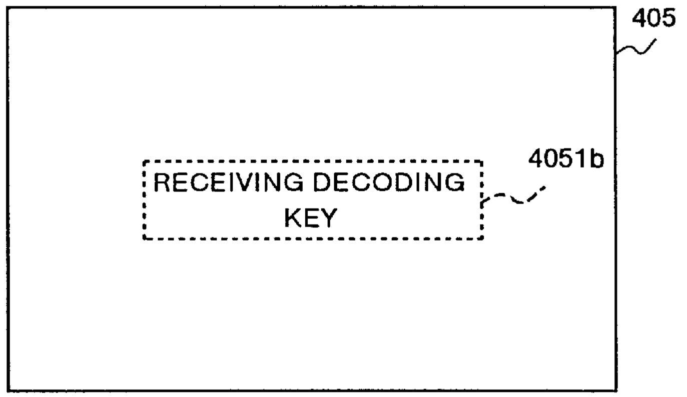

The client 4 as a gift-receiver executes, when the requested decoding key is transmitted according to the authorization of key distribution from the server system 2 (step C24), the processing for receiving the decoding key, decoding the encoded contents having already been received using the decoding key, and accumulating the decoded contents in the contents area 410 of the HD 409 (step C25). If an operation for receiving the decoding key is being executed at this point of time, as shown in FIG. 13B, a message 4051*b* like "Receiving decoding key" appears on the display 405. On the other hand, when the report that the key distribution is unauthorized (step C24) is received, a message indicating that the decoding is unauthorized appears on the display 405 (step C26), and this transaction is terminated.

Figure 13C:
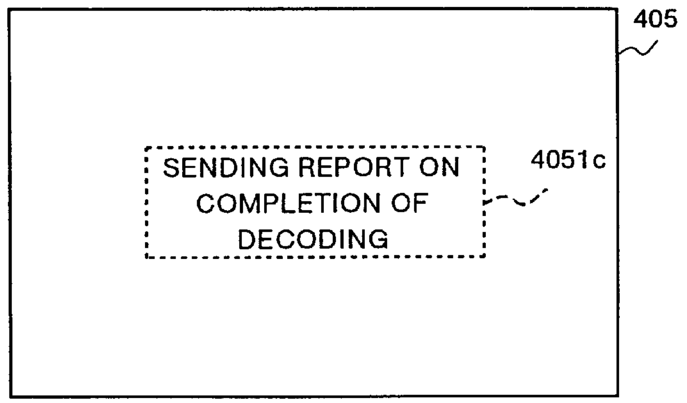

When the operations for decoding and accumulation of the contents are finished in step C25, determination is made as to whether the operation for decoding the contents has successfully been completed or not (step C27). When it is determined that the operation for decoding has successfully been made (step C27), the client 4 sends a report on completion of the decoding to the server system 2 (step C28). If an operation for sending the report on completion of the decoding is being executed at this point of time, as shown in FIG. 13C, a message 4051*c* like "Sending report on completion of decoding" appears on the display 405. Also when it is determined that the operation for decoding the contents could not successfully be completed due to incapability of decoding or for some other reasons (step C27), this transaction is terminated and it is considered that no transaction took place at all.

The server system 2 executes, when having received the report that the decoding has been completed (step S16), the processing for accounting on the gift-presenter as a purchaser based on the recognition that the operation for decoding the contents has successfully been made by the client 4 as a gift-receiver (step S17). On the other hand, when the report on completion of the decoding is not received (step S16), the processing is terminated before the processing for accounting on the gift-presenter is executed. It should be noted that the processing for accounting may be programmed to wait until the report on completion of decoding is received provided that efficient operation of the system is not disturbed.

The data obtained by this processing for accounting is managed as shown in FIG. 15. Namely, in a case of a user ID of AAA as the client 1 in the accounting-log database 208C shown in FIG. 15, the account data LA1, LA2, and LA3 are logged on Oct. 1, 10 and 15 of 1997 respectively on the user AAA. Also, in a case of a user ID of BBB as other client, the account data LB1, and LB2 are logged on Oct. 1 and 7 of 1997 respectively on the user BBB.

As described above, with Embodiment 1, the client 1 as a gift-presenter transmits a (encoded) gift-contents and the gift-presentation data sent from the server system 2 to the client 4 as a gift-receiver, and the server system 2 distributes a decoding key to the client 4 as a gift-receiver in response to a request for a decoding key with the gift-presentation data therefrom so as to decode the gift-contents at the gift-receiver. The request for a decoding key is sent directly from the gift-receiver as described above, which enables use of the contents at the gift-receiver, and for this reason gift presentation with high communication efficiency can be realized with the security insured in a transaction of commodity on the network.

Also, the client 4 as a gift-receiver transmits a report on completion of decoding to the server system 2 after the decoding is completed, and the server system 2 executes the processing for accounting for the gift-contents on the client 1 as a gift-presenter. As described above, the timing of completion of decoding the contents at the gift-receiver can be recognized as completion of all the processing for gift presentation, and for this reason the processing for accounting can be realized without any trouble such that the gift-receiver can not use the contents.

Embodiment 2

In Embodiment 1, the server system executes the processing for accounting when having received a report on completion of decoding from the client as a gift-receiver, but like in Embodiment 2 described below, the server system may be programmed, to forcefully cancel the operational sequence for the gift presentation, if the report on completion of decoding is not received within a specified period of time after the processing for gift presentation is executed.

In Embodiment 2, as the entire configuration is the same as that in Embodiment 1, description is made hereinafter only for the different points from Embodiment 1. At first description is made for the key sections of an online gift-presentation system according to Embodiment 2.

Figure 16:
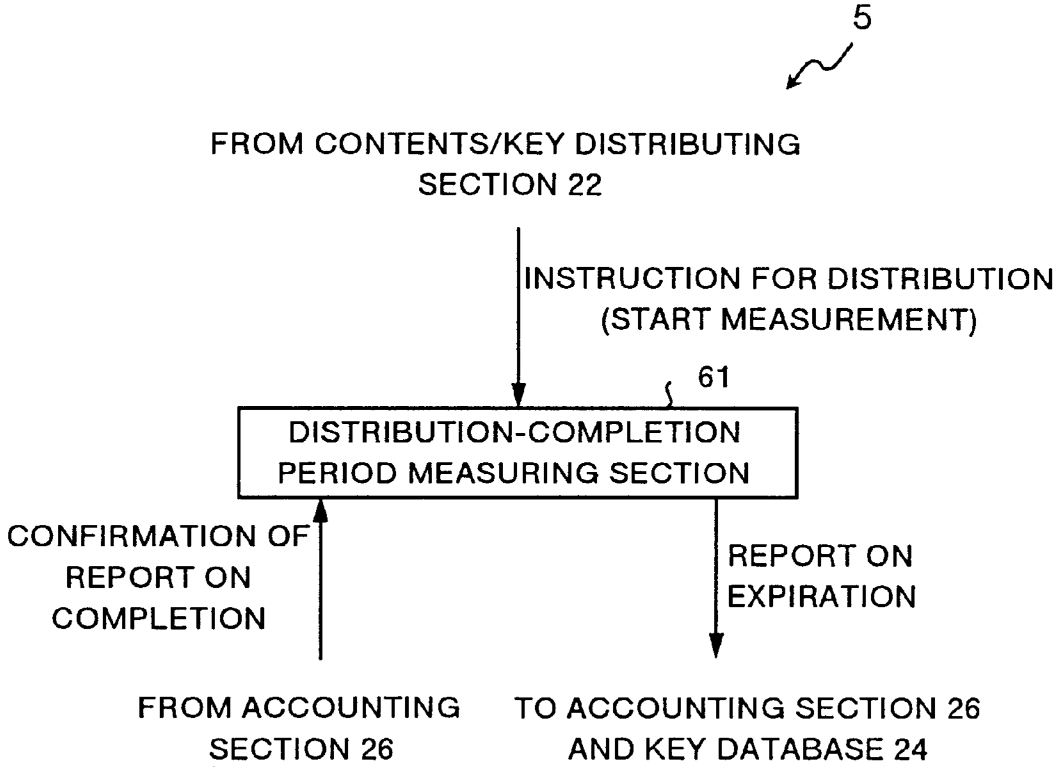
FIG. 16 is a block diagram functionally showing key sections of an online gift-presentation system according to Embodiment 2 of the present invention.

FIG. 16 is a block diagram functionally showing the key sections of the online gift-presentation system according to Embodiment 2 of the present invention. The online gift-presentation system according to Embodiment 2 further comprises a distribution-completion period measuring section 61 for measuring a specified period of time. This distribution-completion period measuring section 61 measures, assuming for instance that the configuration according to Embodiment 1 is employed, a specified period of time when having received an instruction for distribution, namely a starting signal for measurement sent from the contents/key distributing section 22.

This distribution-completion period measuring section 61 instructs, when the report on completion of decoding does not arrive at the accounting section 26 during measurement of the specified period of time, the measuring section 26 to refuse the key request and also instructs the key database 24 to cancel the processing for measurement. Generally, the measuring section 26 executes the processing for measurement according to the report on completion of decoding, but in Embodiment 2, the processing for gift presentation is automatically canceled when the specified period of time is over after the distribution is made according a result of measurement by the distribution-completion period counting section 61.

It should be noted that the distribution-completion period measuring section 61 also stops a measuring operation, in addition to the case where the operation for measuring a specified period of time is finished, when a report on completion is sent thereto from the accounting section 26 which has received the report on completion of decoding within the specified period of time.

Figure 17:
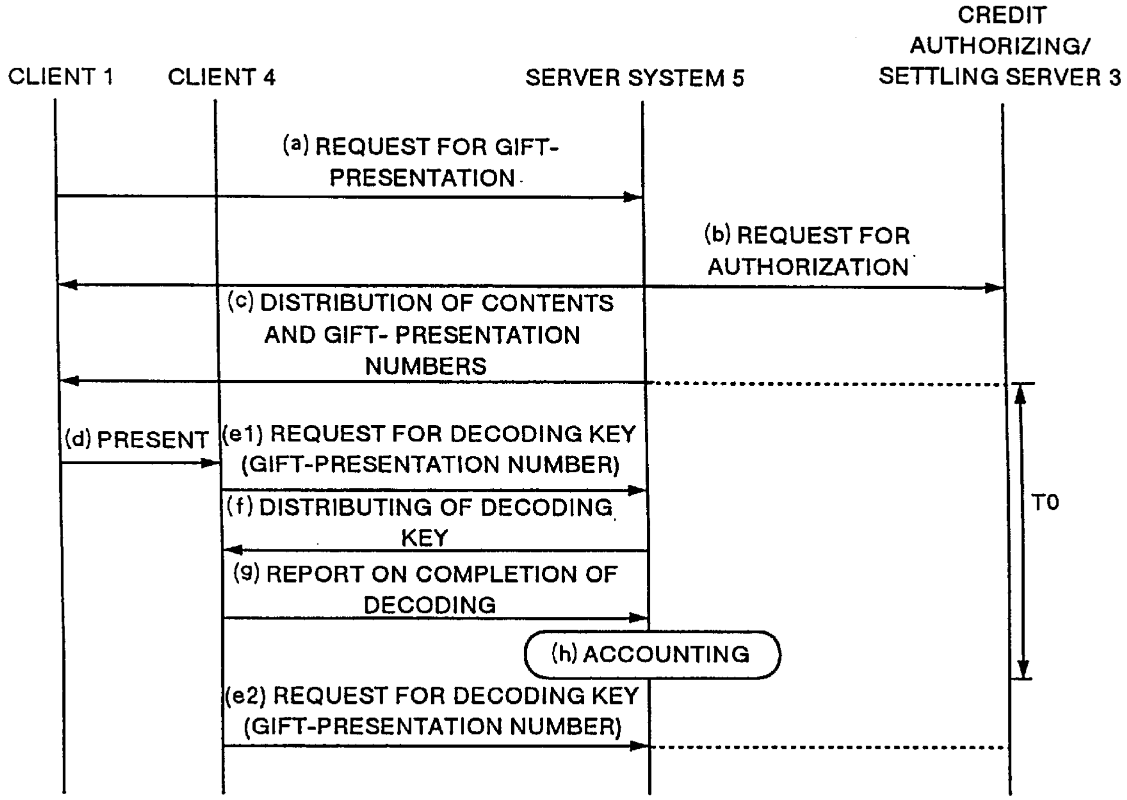
FIG. 17 is a view for explaining an example of an operational sequence of the online gift-presentation system according to Embodiment 2.

In the next, description is made for an operational sequence. FIG. 17 is a view for explaining an example of the operational sequence of the online gift-presentation system according to Embodiment 2. The reference numeral 5 indicates a server system in FIG. 17. Description is made herein only for a sequence different from that in Embodiment 1. As far as the principle thereof is concerned, like in Embodiment 1, the processing for gift presentation is executed according to the sequence shown in FIG. 3.

In FIG. 17, the sequence from the reference signs (a) to (i) ((i) is omitted in the figure) are also required, but, after the contents and the gift-presentation number are distributed (c), the server system 5 executes to measure a specified period of time indicated by the reference sign T0. When a report on completion of decoding is transmitted from the client 4 as a gift receiver to the server system 5 during measurement of the specified period of time T0 (e1), the server system 5 executes the processing for distributing the decoding key (f) as well as for accounting on the gift-presenter (g).

On the other hand, when measurement of the specified period of time T0 is over before a request for a key is received, refusal of the request and cancellation of the processing for accounting are automatically executed in the server system 5, and for this reason, the key request is invalidated even if the request (the gift-presentation number included) arrives from the client 4 as a gift-receiver thereafter because the processing for gift-presentation has already been canceled. Accordingly, gift-presentation is forcefully invalidated on the system when the specified period of time T0 is over.

Figure 18:
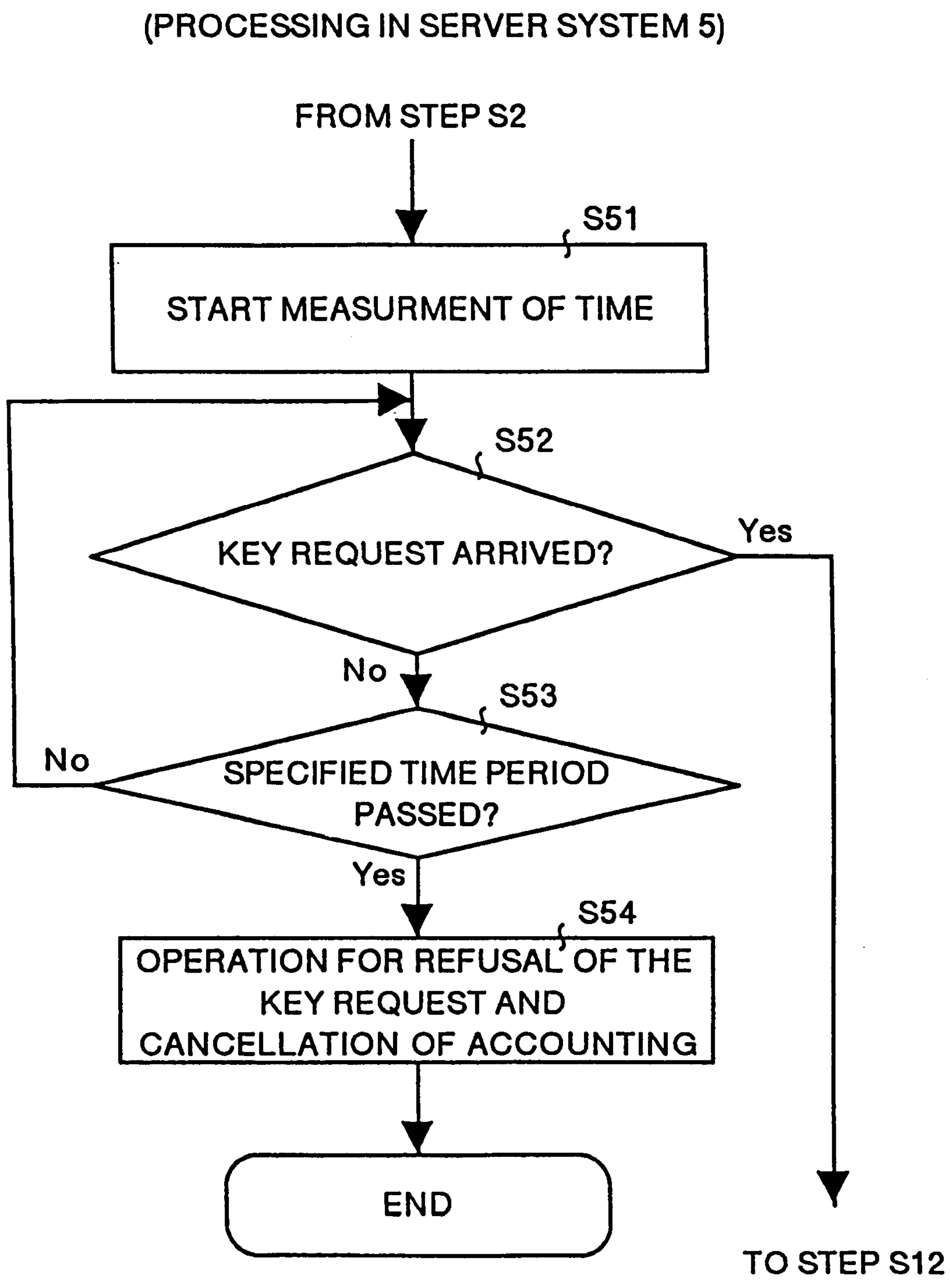
FIG. 18 is a flow chart for explaining operations of the key sections according to Embodiment 2.

In the next, description is made only for the key sections of the operation for online shopping. FIG. 18 is a flow chart for explaining operations of the key sections according to Embodiment 2. Description hereinafter assumes a case where the operations are applied to Embodiment 1. In Embodiment 2, when requested contents and the gift-presentation number are distributed and a report on completion of reception is received from the client 1 as a gift-presenter (refer to step S7 in FIG. 9), measurement of a specified period of time is started (step S51). Then, in step S52, determination is made as to whether the key request has arrived at the server system 5 or not, and in step S53, the processing for determining whether the specified period of time T0 has passed or not is executed. If there is no key request and the measurement of the specified period of time is still being continued, the processing in step S52 and step S53 is repeatedly executed.

Then, when arrival of the key request from the client 4 as a gift-receiver is detected before the specified period of time T0 is over (step S52), the processing shifts to step S12 and on in FIG. 10. On the other hand, when elapse of the specified period of time T0 is detected before the key request arrives in step S53, the processing shifts to step S54, and operations for refusal of the key request and for cancel of accounting are forcefully executed. When the operations for refusal of the key request and for cancel of accounting are executed as described above. The decoding key is not distributed even if the key request arrives thereafter, and with this operation the contents can not be used at the gift-receiver, which makes accounting on the gift-presenter become unnecessary.

As described above, with Embodiment 2, in addition to the fact that the same effects as those in Embodiment 1 are obtained, the server system refuses, when a specified period of time passes after the contents is distributed, a request for decoding from the terminal equipment as a gift-receiver, and cancels the processing for accounting for the encoded gift-contents, so that, if there is any doubt that any trouble might have occurred in the processing for gift presentation according to measurement of time, the transaction of the gift itself can be canceled by the server system. For this reason, smooth and efficient distribution of commodity can be realized in the electronic market without making the processing for accounting delayed more than required.

With this invention, when encoded gift-contents and gift-presentation data thereof are transmitted from a server system to a terminal equipment as a gift-presenter and a request for decoding using the gift-presentation data is sent from a terminal equipment as a gift-receiver to the server system, the server system transmits a decoding key for decoding of the encoded gift-contents to the terminal equipment as a gift-receiver, so that the request for decoding is sent directly from the gift-receiver; whereby there is provided the effect that it is possible to obtain an online which can realize gift presentation with the security insured in a transaction of commodity on the network.

With this invention, when a report on completion of an operation for decoding of the encoded gift-contents using a decoding key is sent from a terminal equipment as a gift-receiver to a server system, the server system executes processing for accounting for the gift-contents on the terminal equipment as a gift-presenter, so that the timing of completion of an operation for decoding the contents on the side of the gift-receiver can be recognized as completion of all the processing for gift presentation; whereby there is provided the effect that it is possible to obtain an online gift presentation system which can realize accounting without causing any trouble such that the gift-receiver can not use the contents.

With this invention, when encoded gift-contents and gift-presentation data thereof are transmitted from a server system to a terminal equipment as a gift-presenter and if a specified period of time passes, the server system refuses a request for a decoding key from the terminal equipment as a gift-receiver and cancels the processing for accounting for the gift-contents, so that, if there is any doubt that any trouble might have occurred in the processing for gift presentation from the lapse of time, the transaction of the gift itself can be canceled by the server system; whereby there is provided the effect that it is possible to obtain a online gift presentation system which can realize smooth and efficient distribution of commodity in the electronic market without making the processing for accounting delayed more than required.

With this invention, a terminal equipment as a gift-presenter transmits encoded gift-contents and gift-presentation data thereof having been sent from a server system to a terminal equipment as a gift-receiver, and the server system distributes a decoding key to the terminal equipment as a gift-receiver in response to a request for decoding using the gift-presentation data therefrom so as to decode the gift-contents by the gift-receiver, so that the request for decoding is sent directly from the gift-receiver with the usability of the contents confirmed on the side of the gift-receiver; whereby there is provided the effect that it is possible to obtain an online gist presentation system which can realize gift presentation with high communication efficiency and also with the security insured in a transaction of commodity on the network.

With this invention, a terminal equipment as a gift-receiver transmits a report on completion of decoding to a server system after the operation for decoding is complete, and the server system executes the processing for accounting for the gift-contents on a terminal equipment as a gift-presenter, so that the timing of completion of the operation for decoding the contents on the side of the gift-receiver can be recognized as completion of all the processing for gift presentation; whereby there is provided the effect that it is possible to obtain an online gift presentation system which can realize the processing for accounting without any trouble such that the gift-receiver can not use the contents.

With this invention, a server system refuses, if a specified period of time passes after the contents is distributed, a request for a decoding key from a terminal equipment as a gift-receiver and cancels the processing for accounting for the encoded gift-contents, so that, if there is any doubt that any trouble might have occurred in the processing for gift presentation from the lapse of time, the transaction of the gift itself can be canceled by the server system; whereby there is provided the effect that it is possible to obtain an online gift presentation system which can realize efficient distribution of commodity in the electronic market without making the processing for accounting delayed more than required.

With this invention, encoded gift-contents requested by a terminal equipment as a gift-presenter as well as gift-presentation data used for sending back a request to decode the contents are distributed to the terminal equipment as a gift-presenter in response to the request for gift-presentation sent from the terminal equipment as a gift-presenter, and then, a decoding key for decoding the encoded gift-contents is distributed to a terminal equipment as a gift-receiver in response to the request for decoding by the terminal equipment as a gift-receiver, so that the request for decoding is sent directly from the gift-receiver with the usability of the contents confirmed on the side of the gift-receiver; whereby there is provided the effect that it is possible to obtain a online gift presentation system with high communication efficiency and also with the security insured in a transaction of commodity on the network.

With this invention, in the online gift-presentation system in which a report on completion of decoding is transmitted from a terminal equipment as a gift-receiver after the operation for decoding is complete, when the report on completion of decoding is received from the terminal equipment as a gift-receiver, the processing for accounting for the gift-contents is executed on the terminal equipment as a gift-presenter, so that the timing of completion of decoding of the contents on the side of the gift-receiver can be recognized as completion of all the processing for gift presentation; whereby there is provided the effect that it is possible to provide an online gift presentation system which can realize the processing for accounting without any trouble such that the gift-receiver can not use the contents.

With this invention, if a specified period of time passes after the contents is distributed, a request for a decoding key from a terminal equipment as a gift-receiver is refused, and at the same time the processing for accounting for the encoded gift-contents is canceled, so that, if there is any doubt that any trouble might have occurred in the processing for gift presentation from the lapse of time, the transaction of the gift itself can be canceled by the server system; whereby there is provided the effect that it is possible to obtain an online gift presentation system which can realize smooth and efficient distribution of commodity in the electronic market without making the processing for accounting delayed more than required.

With this invention, a terminal equipment as a gift-presenter transmits encoded gift-contents as well as gift-presentation data thereof having been sent from a server system to a terminal equipment as a gift-receiver, and the terminal equipment as a gift-receiver decodes the gift-contents using a decoding key distributed from the server system in response to the request for a decoding key with the gift-presentation data sent from the gift-receiver to the server system, so that the request for decoding is sent directly from the gift-receiver with the usability of the contents confirmed on the side of the gift-receiver; whereby there is provided the effect that it is possible to obtain an online gift presentation system with high communication efficiency and also with the security insured in a transaction of commodity on the network.

With this invention, in the online gift-presentation system in which the processing for accounting for gift-contents is executed on a terminal equipment as a gift-presenter when a report on completion of decoding is received from a terminal equipment as a gift-receiver, if the terminal equipment as a gift-presenter and the terminal equipment as a gift-receiver are the same, then the equipment transmits a report on completion of decoding to a server system after the decoding is complete, so that the timing of completion of the operation for decoding the contents at the gift-receiver can be reported as completion of all the processing for gift presentation to the server system; whereby there is provided the effect that it is possible to obtain an online gift presentation system which can realize the processing for accounting without any trouble such that the gift-receiver can not use the contents.

With this invention, when encoded gift-contents as well as gift-presentation data thereof is transmitted from a server system to a terminal equipment as a gift-presenter and a terminal equipment as a gift-receiver sends a request for a decoding key with the gift-presentation data to the server system, there is provided a step of transmitting a decoding key for decoding of the encoded gift-contents from the server system to the terminal equipment as a gift-receiver, so that the request for decoding is sent directly from the gift-receiver; whereby there is provided the effect that it is possible to obtain an online gift presentation system which can realize gift presentation with the security insured in a transaction of commodity on the network.

With this invention, when a report on completion of the operation for decoding encoded gift-contents using a decoding key is sent from a terminal equipment as a gift-receiver to a server system, there is provided a step of executing the processing for accounting for the gift-contents on a terminal equipment as a gift-presenter, so that the timing of completion of the operation for decoding the contents at the gift-receiver can be recognized as completion of all the processing for gift presentation; whereby there is provided the effect that it is possible to obtain an online gift presentation system which can realize the processing for accounting without any trouble such that the gift-receiver can not use the contents.

With this invention, when encoded gift-contents and gift-presentation data thereof are transmitted from a server system to a terminal equipment as a gift-presenter and if a specified period of time passes, there is provided a step of refusing a request for a decoding key from a terminal equipment as a gift-receiver as well as canceling of the processing for accounting for the gift-contents, so that, if there is any doubt that any trouble might have occurred in the processing for gift presentation from the lapse of time, the transaction of the gift itself can be canceled by the server system; whereby there is provided the effect that it is possible to obtain an online gift presentation system which can realize smooth and efficient distribution of commodity in the electronic market without making the processing for accounting delayed more than required.

With this invention, there is provided a recording medium which records therein a program for making a computer execute the method according to any one of the present inventions, which makes the program machine-readable; whereby there is provided the effect that it is possible to obtain a recording medium which can realize operations according to this invention with a computer.

This application is based on Japanese patent application No. HEI 9-312379 filed in the Japanese Patent Office on Nov. 13, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An online gift-presentation system comprising:

a server system connected to a network for virtually constructing an electronic market formed with a plurality of contents on said network and providing controls for selling the contents and accounting for sold contents through said electronic market; and a plurality of terminal equipment each connected to said network for providing controls for accessing said electronic market and purchasing the contents at least one of said terminals being a gift presenter and at least another one of said terminals being a gift receiver; wherein, when one of said terminal equipment that is a gift-presenter sends a request for gift-presentation to said server system, said server system transmits encoded gift-contents requested by said terminal equipment as a gift-presenter as well as gift-presentation data for requesting to decode the contents to said terminal equipment as a gift-presenter, and when one of said plurality of terminal equipment that is a gift-receiver transmits a request for decoding using said gift-presentation data to said server system after the transmission, said server system transmits a decoding key for decoding of said encoded gift-contents to said terminal equipment as a gift-receiver.

2. An online gift-presentation system according to claim 1; wherein said server system executes, when having received a report on completion of an operation for decoding of said encoded gift-contents using said decoding key from said terminal equipment as a gift-receiver, processing for accounting for said gift-contents on said terminal equipment as a gift-presenter.

3. An online gift-presentation system according to claim 1; wherein said server system refuses, when a specified period of time passes after said encoded gift-contents and the gift-presentation data are transmitted to said terminal equipment as a gift-presenter, the request for decoding from said terminal equipment as a gift-receiver, and cancels the processing for accounting for said gift-contents.

4. An online gift-presentation system according to claim 2; wherein said server system refuses, when a specified period of time passes after said encoded gift-contents and the gift-presentation data are transmitted to said terminal equipment as a gift-presenter, the request for decoding from said terminal equipment as a gift-receiver, and cancels the processing for accounting for said gift-contents.

5. An online gift-presentation system comprising:

a server system connected to a network for virtually constructing an electronic market formed with a plurality of contents on said network and providing controls for selling the contents and accounting for sold contents through said electronic market; and a plurality of terminal equipment each connected to said network for providing controls for accessing said electronic market and purchasing the contents; wherein a terminal equipment as a gift-presenter comprising:

a gift-presentation requesting unit for requesting to present desired encoded gift-contents to said server system in said electronic market constructed on said network; and a gift-contents transmitting unit for transmitting, when having received said encoded gift-contents and said gift-presentation data used for sending back a request to decode said contents each transmitted from said server system in response to the request for gift-presentation by said gift-presentation requesting unit, said encoded gift-contents and the gift-presentation data to said terminal equipment as a gift-receiver; and a terminal equipment, different from said gift presenter and serving as a gift-receiver comprising:

a decoding requesting unit for requesting to decode, when having received said encoded gift-contents and the gift-presentation data transmitted from said gift-contents transmitting unit, the encoded gift-contents using the received gift-presentation data to said server system; and a decoding unit for decoding said encoded gift-contents, when having received a decoding key for decoding of said encoded gift-contents transmitted in response to the request for decoding by said decoding requesting unit, using said decoding key; and further said server system comprising:

a contents distributing unit for distributing encoded gift-contents requested by said terminal equipment as a gift-presenter and said gift-presentation data used for sending back a request to decode said contents to said terminal equipment as a gift-presenter in response to the request for gift-contents by said gift-presentation requesting unit; and a key distributing unit for distributing said decoding key for decoding of said encoded gift-contents to said terminal equipment as a gift-receiver in response to the request for decoding by said decoding requesting unit in said terminal equipment as a gift-receiver after the distribution of the contents by said distributing unit.

6. An online gift-presentation system according to claim 5; wherein said terminal equipment as a gift-receiver transmits a report on completion of decoding to said server system after the operation for decoding is complete, and said server system executes, when having received said report on completion of decoding from said terminal equipment as a gift-receiver, the processing for accounting for said gift-contents on said terminal equipment as a gift-presenter.

7. An online gift-presentation system according to claim 5; wherein said server system refuses, when a specified period of time passes after the contents is distributed by said contents distributing unit, the request for decoding from said terminal equipment as a gift-receiver, and cancels the processing for accounting for said encoded gift-contents.

8. An online gift-presentation system according to claim 6; wherein said server system refuses, when a specified period of time passes after the contents is distributed by said contents distributing unit, the request for decoding from said terminal equipment as a gift-receiver, and cancels the processing for accounting for said encoded gift-contents.

9. A server system for the online gift-presentation system having:

a server system connected to a network for virtually constructing an electronic market formed with a plurality of contents on said network and providing controls for selling the contents and accounting for sold contents through said electronic market; and a plurality of terminal equipment each connected to said network for providing controls for accessing said electronic market and purchasing the contents; wherein a terminal equipment as a gift-presenter requests to present desired encoded gift-contents to said server system in said electronic market constructed on said network and transmits said encoded gift-contents and a gift-presentation data used for sending back a request to decode said contents each transmitted from said server system to a different terminal equipment as a gift-receiver; and a terminal equipment as a gift-receiver is a server system for an online gift-presentation system requesting to decode, when having received said encoded gift-contents and the gift-presentation data transmitted from said terminal equipment as a gift-presenter, the contents using said gift-presentation data to said server system, and decoding said encoded gift-contents, when having received a decoding key for decoding said encoded gift-contents transmitted in response to the request for decoding, using said decoding key; said server system comprising:

a contents distributing unit for distributing encoded gift-contents requested by said terminal equipment as a gift-presenter and gift-presentation data used for sending back a request to decode said contents to said terminal equipment as a gift-presenter in response to the request for gift-presentation by said terminal equipment as a gift-presenter; and a key distributing unit for distributing said decoding key for decoding said encoded gift-contents to said terminal equipment as a gift-receiver in response to the request for decoding by said terminal equipment as a gift-receiver after the distribution of the contents by said distributing unit.

10. A server system for the online gift-presentation system according to claim 9; wherein, in said online gift-presentation system, said terminal equipment as a gift-receiver transmits a report on completion of decoding to said server system after the decoding is complete, and said server system executes, when having received said report on completion of decoding from said terminal equipment as a gift-receiver, the processing for accounting for said gift-contents on said terminal equipment as a gift-presenter.

11. A server system for the online gift-presentation system according to claim 9; wherein said server system refuses, when a specified period of time passes after the contents is distributed by said contents distributing unit, the request for decoding from said terminal equipment as a gift-receiver, and cancels the processing for accounting for said encoded gift-contents.

12. A server system for the online gift-presentation system according to claim 10; wherein said server system refuses, when a specified period of time passes after the contents is distributed by said contents distributing unit, the request for decoding from said terminal equipment as a gift-receiver, and cancels the processing for accounting for said encoded gift-contents.

13. Terminal equipment for an online gift-presentation system having:

a server system connected to a network for virtually constructing an electronic market formed with a plurality of contents on said network and providing controls for selling the contents and accounting for sold contents through said electronic market; and a plurality of terminal equipment, each connected to said network for providing controls for accessing said electronic market and purchasing the contents, at least one of said terminals being a gift presenter and at least another one of said terminals being a gift receiver; and said server system distributes encoded gift-contents requested by said terminal equipment as a gift-presenter and gift-presentation data used for sending back a request to decode said contents to said terminal equipment as a gift-presenter in response to the request for gift-presentation by said gift-presentation requesting unit, and distributes said decoding key for decoding of said encoded gift-contents to said terminal equipment as a gift-receiver in response to the request for decoding by said decoding requesting unit in the terminal equipment as a gift-receiver after the distribution of the contents; wherein said terminal equipment comprising:

a gift-presentation requesting unit for requesting to present desired encoded gift-contents to said server system in said electronic market constructed on said network;

a gift-contents transmitting unit for transmitting, when having received said encoded gift-contents and said gift-presentation data used for sending back a request to decode said contents each transmitted from said server system in response to the request for gift-presentation by said gift-presentation requesting unit, said encoded gift-contents and the gift-presentation data to said terminal equipment as a gift-receiver;

a decoding requesting unit for requesting to decode, when having received said encoded gift-contents and the gift-presentation data transmitted from said gift-contents transmitting unit, the contents using said received gift-presentation data to said server system; and a decoding unit for decoding said encoded gift-contents, when having received a decoding key for decoding said encoded gift-contents transmitted in response to the request for decoding by said decoding requesting unit by means of using said decoding key.

14. Terminal equipment for the online gift-presentation system according to claim 13; wherein said online gift-presentation system executes, when having received a report on completion of decoding from terminal equipment as a gift-receiver, the processing for accounting for said gift-contents on said terminal equipment as a gift-presenter, and said terminal equipment transmits, when the original terminal equipment is terminal equipment as a gift-receiver, a report on completion of decoding to said server system after the decoding is complete.

15. A gift-presenting method for the online gift-presentation system having:

a server system connected to a network for virtually constructing an electronic market formed with a plurality of contents on said network and providing controls for selling the contents and accounting for sold contents through said electronic market; and a plurality of terminal equipment, each connected to said network for providing controls for accessing said electronic market and purchasing the contents at least one of said terminals being a gift presenter and at least another one of said terminals being a gift receiver; said method comprising:

a first step of transmitting, when one of said terminal equipment as a gift-presenter requests gift-presentation to said server system, encoded gift-contents requested by said terminal equipment as a gift-presenter as well as gift-presentation data for sending back a request to decode the contents from said server system to said terminal equipment as a gift-presenter; and a second step of transmitting, when one of said plurality of terminal equipment as a gift-receiver transmits a request for decoding using said gift-presentation data to said server system after the transmission in said first step, a decoding key for decoding said encoded gift-contents from said server system to said terminal equipment as a gift-receiver.

16. A gift-presenting method for the online gift-presentation system according to claim 15 further comprising:

a third step of executing, when a report on completion of decoding said encoded gift-contents using said decoding key is sent from said terminal equipment as a gift-receiver to said server system, the processing for accounting for said gift-contents on said terminal equipment as a gift-presenter.

17. An online gift-presenting method according to claim 15 further comprising:

a fourth step of refusing, when a specified period of time passes after said encoded gift-contents and the gift-presentation data are transmitted from said server system to said terminal equipment as a gift-presenter, the request for decoding from said terminal equipment as a gift-receiver as well as canceling the processing for accounting for said gift-contents.

18. An online gift-presenting method according to claim 16 further comprising:

a fourth step of refusing, when a specified period of time passes after said encoded gift-contents and the gift-presentation data are transmitted from said server system to said terminal equipment as a gift-presenter, the request for decoding from said terminal equipment as a gift-receiver as well as canceling the processing for accounting for said gift-contents.

19. A computer-readable recording medium with a program making a computer execute a gift-presenting method for an online gift-presentation system having:

a server system connected to a network for virtually constructing an electronic market formed with a plurality of contents on said network and providing controls for selling the contents and accounting for sold contents through said electronic market; and a plurality of terminal equipment each connected to said network for providing controls for accessing said electronic market and purchasing the contents; said method comprising:

a first step of transmitting when one of said terminal equipment as a gift-presenter requests gift-presentation to said server system, encoded gift-contents requested by said terminal equipment as a gift-presenter as well as gift-presentation data for sending back a request to decode the contents from said server system to said terminal equipment as a gift-presenter; and a second step of transmitting, when one of said plurality of terminal equipment as a gift-receiver transmits a request for decoding using said gift-presentation data to said server system after the transmission in said first step, a decoding key for decoding said encoded gift-contents from said server system to said terminal equipment as a gift-receiver.

20. The computer readable recording medium according to claim 19 wherein said method further comprises:

a third step of executing, when a report on completion of decoding said encoded gift-contents using said decoding key is sent from said terminal equipment as a gift-receiver to said server system, the processing for accounting for said gift-contents on said terminal equipment as a gift-presenter.

21. The computer readable recording medium according to claim 19 wherein said method further comprises:

a step of refusing, when a specified period of time passes after said encoded gift-contents and the gift-presentation data are transmitted from said server system to said terminal equipment as a gift-presenter, the request for decoding from said terminal equipment as a gift-receiver as well as canceling the processing for accounting for said gift-contents.

22. The computer readable recording medium according to claim 20 wherein said method further comprises:

a fourth step of refusing, when a specified period of time passes after said encoded gift-contents and the gift-presentation data are transmitted from said server system to said terminal equipment as a gift-presenter, the request for decoding from said terminal equipment as a gift-receiver as well as canceling the processing for accounting for said gift-contents.

* * * * *